(12) United States Patent
Yamada et al.

(10) Patent No.: US 8,254,594 B2
(45) Date of Patent: Aug. 28, 2012

(54) IN-VEHICLE APPARATUS

(75) Inventors: Kenji Yamada, Tokyo (JP); Takehiko Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1568 days.

(21) Appl. No.: 11/717,036

(22) Filed: Mar. 13, 2007

(65) Prior Publication Data
US 2007/0286434 A1 Dec. 13, 2007

(30) Foreign Application Priority Data

Mar. 16, 2006 (JP) .................................. 2006-072386

(51) Int. Cl.
H04R 25/00 (2006.01)
(52) U.S. Cl. ......................................... 381/86; 381/389
(58) Field of Classification Search .................... 381/86, 381/365, 389; 710/303
See application file for complete search history.

(56) References Cited

U.S. PATENT DOCUMENTS
6,993,615 B2 * 1/2006 Falcon .............................. 381/86
7,117,286 B2 * 10/2006 Falcon .............................. 381/86

FOREIGN PATENT DOCUMENTS

| | | |
|---|---|---|
| JP | 06-092187 | 4/1994 |
| JP | 08-007418 | 1/1996 |
| JP | 2001-301537 | 10/2001 |
| JP | 2002-166786 | 6/2002 |
| JP | 2003-051180 | 2/2003 |
| JP | 2003-069920 | 3/2003 |
| JP | 2003-072477 | 3/2003 |

* cited by examiner

*Primary Examiner* — Suhan Ni
(74) *Attorney, Agent, or Firm* — Finnegan, Henderson, Farabow, Garrett & Dunner, L.L.P.

(57) ABSTRACT

Disclosed herein is an in-vehicle apparatus having an apparatus body, a loading slot formed on the front surface of the apparatus body, a front panel arranged in front of the apparatus body, and a drive mechanism for operatively connecting the front panel to the apparatus body so as to move the front panel. The front panel is movable by the drive mechanism to a normal position where the front panel is arranged in parallel to the front surface of the apparatus body, a left projected position where a left side portion of the front panel is projected frontward, a right projected position where a right side portion of the apparatus body is projected frontward, and an open position where the front panel is inclined frontward so as to open a loading slot formed on the front surface of the apparatus body for loading a recording medium.

9 Claims, 21 Drawing Sheets

IN-VEHICLE APPARATUS

CROSS REFERENCES TO RELATED APPLICATIONS

The present invention contains subject matter related to Japanese Patent Application JP 2006-072386, filed in the Japanese Patent Office on Mar. 16, 2006, the entire contents of which being incorporated herein by reference.

BACKGROUND OF THE INVENTION

1. Field of the Invention

The present invention relates to an in-vehicle. apparatus.

2. Description of the Related Art

Known is an in-vehicle apparatus such as a car audio system and a car navigation system, which apparatus includes an apparatus body installed in a compartment and a front panel arranged in front of the apparatus body and having operation members for operating the apparatus body (see Japanese Patent Laid-open No. 2002-166786).

The in-vehicle apparatus is built in a portion of a vehicle body such as a dashboard or a center console panel in the condition that the front panel is oriented to the rear side of the vehicle body.

Accordingly, in the case that the in-vehicle apparatus is located so as to face either a driver seat or a passenger seat, a user sitting in any one of the driver seat and the passenger seat can easily operate the operation members of the front panel, but it is difficult for another user sitting in the other seat to operate the operation members of the front panel.

In many cases, such an in-vehicle apparatus is built in the center console panel located at the middle position between the driver seat and the passenger seat, and the front panel is oriented to the rear side of the vehicle body. Accordingly, none of the users sitting in the driver seat and the passenger seat can easily operate the operation members of the front panel.

SUMMARY OF THE INVENTION

Now, the present invention provides an in-vehicle apparatus which can be easily operated by both the users sitting in the driver seat and the passenger seat, thereby improving the usability of the in-vehicle apparatus. The present invention also provides an in-vehicle apparatus which can be simplified in structure.

In accordance with an embodiment of the present invention, there is provided an in-vehicle apparatus including an apparatus body installed in a compartment and having a reproducing portion for reproducing data recorded on a recording medium; a loading slot formed on the front surface of said apparatus body for loading and unloading said recording medium; a front panel arranged in front of said apparatus body and having operation members for operating said apparatus body; and a drive mechanism for operatively connecting said front panel to said apparatus body so as to move said front panel; said front panel being movable by said drive mechanism to a normal position where said front panel is oriented in parallel to the front surface of said apparatus body, a left projected position where a left side portion of said front panel is projected frontward in comparison with a right side portion of said front panel, a right projected position where the right side portion of said front panel is projected frontward in comparison with the left side portion of said front panel, and an open position where said front panel is inclined frontward so as to open said loading slot; said normal position being interposed between said left projected position and said open position during the movement of said front panel and also interposed between said right projected position and said open position during the movement of said front panel.

In accordance with another embodiment of the present invention, there is provided an in-vehicle apparatus including an apparatus body installed in a compartment and having a reproducing portion for reproducing data recorded on a recording medium; a loading slot formed on the front surface of said apparatus body for loading and unloading said recording medium; a front panel arranged in front of said apparatus body and having operation members for operating said apparatus body; and a drive mechanism for operatively connecting said front panel to said apparatus body so as to move said front panel; said front panel being movable by said drive mechanism to a normal position where said front panel is oriented in parallel to the front surface of said apparatus body, a left projected position where a left side portion of said front panel is projected frontward in comparison with a right side portion of said front panel, a right projected position where the right side portion of said front panel is projected frontward in comparison with the left side portion of said front panel, and an open position where said front panel is inclined frontward so as to open said loading slot; said drive mechanism having a motor for moving said front panel; wherein when said motor is operated in one rotational direction, said front panel is sequentially moved from said left projected position through said normal position, said open position, and said normal position to said right projected position in this order, whereas when said motor is operated in the other rotational direction opposite to said one rotational direction, said front panel is sequentially moved from said right projected position through said normal position, said open position, and said normal position to said left projected position in this order.

In the left projected position of the front panel, the user sitting in the driver seat can easily operate the operation members of the front panel.

In the right projected position of the front panel, the user sitting in the passenger seat can easily operate the operation members of the front panel.

In the open position of the front panel, the recording medium can be loaded and unloaded through the loading slot.

In the normal position of the front panel, the front panel does not become an interference and can improve the appearance in the compartment including the in-vehicle apparatus.

In the case that the user is sitting in the driver seat, it is considered that the front panel is moved most frequently among the left projected position, the normal position, and the open position.

In the case that the user is sitting in the passenger seat, it is considered that the front panel is moved most frequently among the right projected position, the normal position, and the open position.

Accordingly, in the case that the user is sitting in the driver seat, the front panel can be moved quickly and efficiently among the left projected position, the normal position, and the open position. In the case that the user is sitting in the passenger seat, the front panel can be moved quickly and efficiently among the right projected position, the normal position, and the open position. Thus, the in-vehicle apparatus is easy to use, and the practical value of the in-vehicle apparatus can be greatly improved.

The front panel can be moved from the normal position to the left projected position or from the normal position to the open position. Further, the front panel can be moved from the normal position to the right projected position or from the normal position to the open position. Thus, the front panel can be moved from the normal position as a reference position. Accordingly, the motion of the front panel can be simplified, and in the case that the drive mechanism is constructed by using cam grooves and cam pins, the structure of the drive mechanism can be simplified.

Other features of the invention will be more fully understood from the following detailed description and appended claims when taken with the accompanying drawings.

DETAILED DESCRIPTION OF THE PREFERRED EMBODIMENTS

Figure 1:
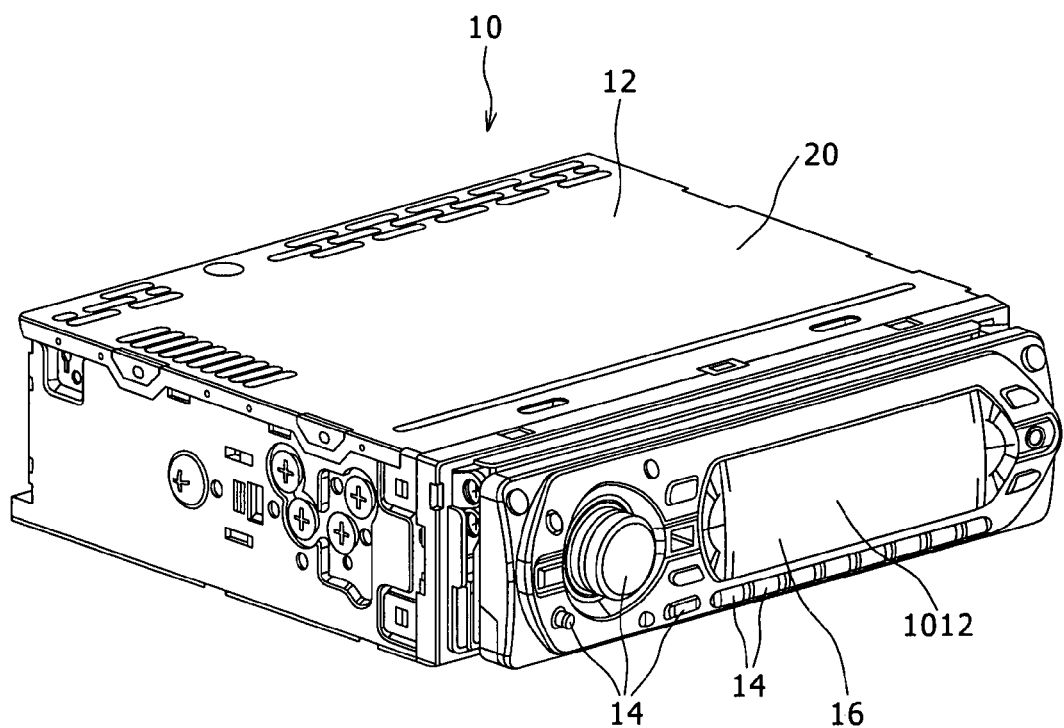
FIG. 1 is a perspective view of an in-vehicle apparatus according to a preferred embodiment of the present invention in the condition that a front panel is in a normal position.

A preferred embodiment of the present invention will now be described with reference to the drawings.

FIGS. 1 to 4 are perspective views of an in-vehicle apparatus 10 according to the preferred embodiment.

As shown in FIGS. 1 to 4, the in-vehicle apparatus 10 is a car audio system using a removable disk-shaped recording medium (optical disk) such as CD, MD, and DVD as an example of the recording medium in the present invention.

The in-vehicle apparatus 10 includes an apparatus body 12 containing a main portion of the car audio system and a front panel 16 provided with a plurality of operation members 14 for operating the apparatus body 12. The apparatus body 12 and the front panel 16 are connected by a drive mechanism 18.

The apparatus body 12 has a flat box-shaped housing 20.

The front surface of the apparatus body 12 has a laterally elongated rectangular shape, and it is formed with a loading slot 22 for loading the disk-shaped recording medium.

The front panel 16 is designed to open and close the front surface of the apparatus body 12. The plural operation members 14 are arranged on the front surface of the front panel 16, and they constitute an operating portion 1010 (see FIG. 6).

Although not specifically shown, the operation members 14 include a volume knob for adjusting the volume of sound generated from a speaker 18 (see FIG. 6), operation switches for performing the start and stop of reproduce of the disk-shaped recording medium D, the selection of tunes recorded on the medium D, the fast forward and fast reverse of the tunes, and the ejection of the medium D, and station selection switches for selecting radio stations through a tuner portion.

Figure 6:
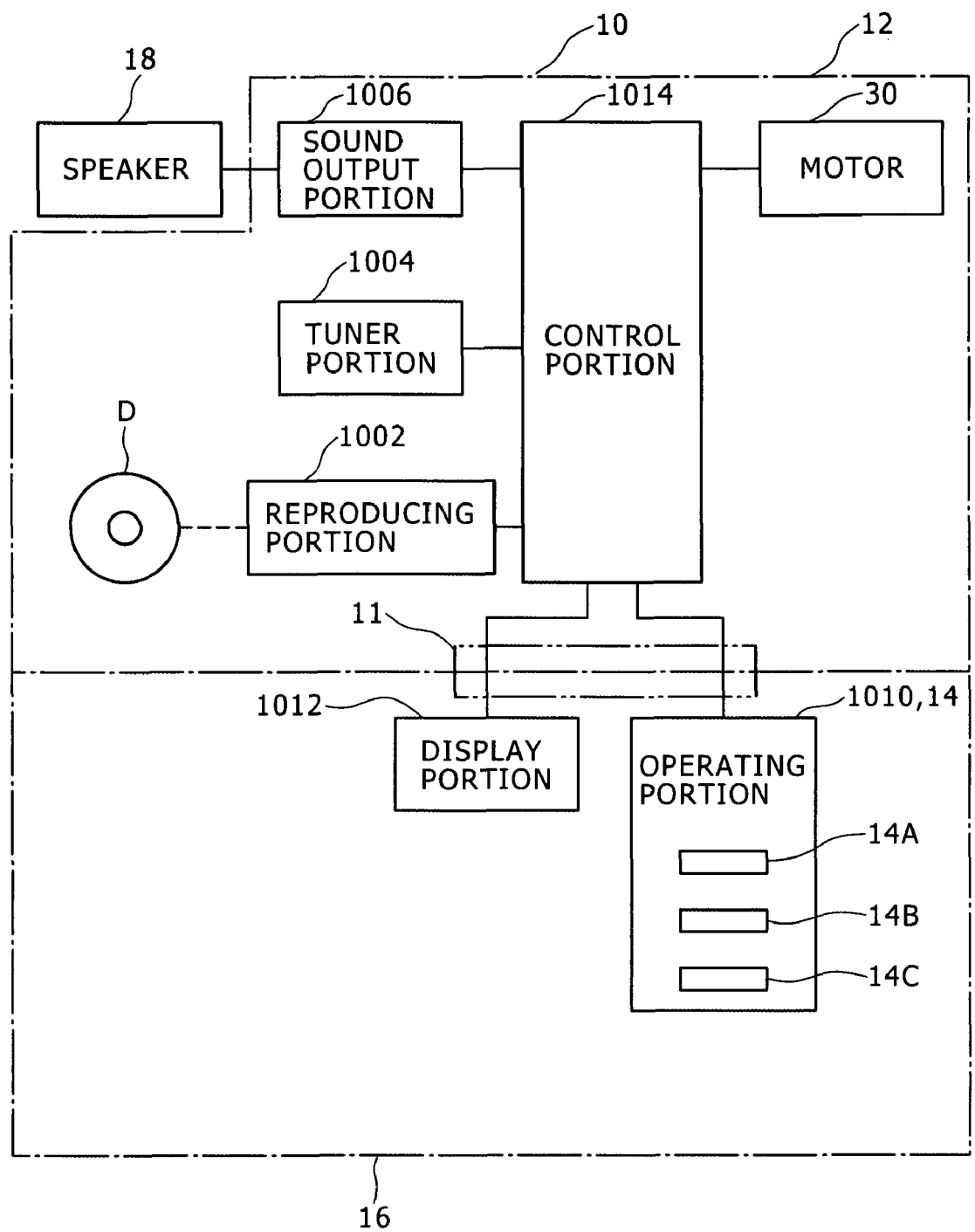
FIG. 6 is a block diagram showing the configuration of a control system in the in-vehicle apparatus.

As shown in FIG. 6, the operation members 14 further include an open/close button 14A for opening and closing the front panel 16, a leftward inclination button 14B for leftward inclining the front panel 16, and a rightward inclination button 14C for rightward inclining the front panel 16.

The front surface of the front panel 16 is formed with a display portion 1012 (see FIG. 6) exposed to the front side of the front panel 16. The display portion 1012 is provided by a light emitting diode (LED) or a liquid crystal display, for example.

In this preferred embodiment, the operating portion 1010 and the display portion 1012 are electrically connected to a control portion 1014 (which will be hereinafter described) through a flexible wiring board 11 (see FIG. 6) provided between the apparatus body 12 and the front panel 16, so that control signals are exchanged between the control portion 1014 and the operating portion 1010 and between the control portion 1014 and the display portion 1012.

Figure 5:
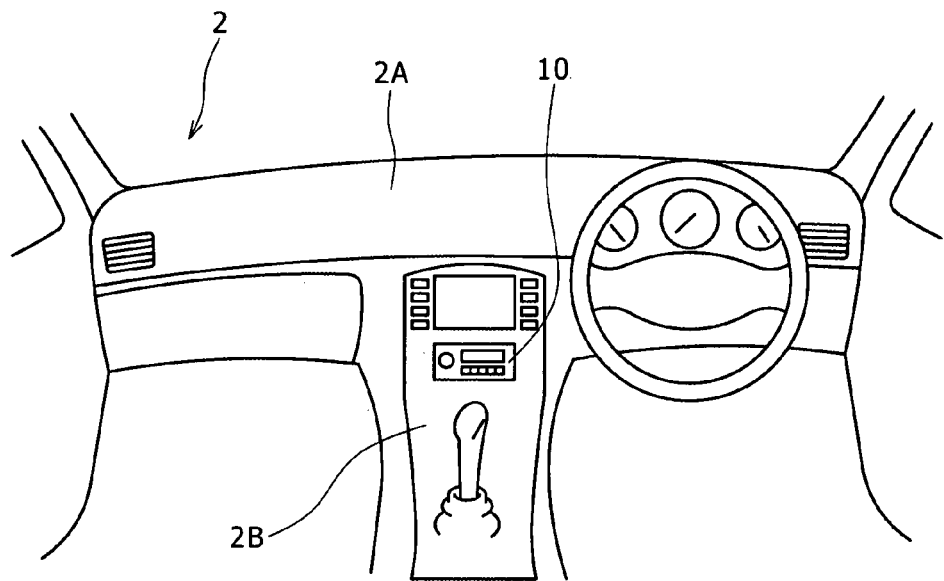
FIG. 5 is an elevational view showing a condition that the in-vehicle apparatus is installed in a compartment.

FIG. 5 is an elevational view showing a condition that the in-vehicle apparatus 10 is installed in a compartment 2, and FIG. 6 is a block diagram showing the configuration of a control system in the in-vehicle apparatus 10.

As shown in FIG. 5, the apparatus body 12 of the in-vehicle apparatus 10 is built in a dashboard 2A or a center console panel 2B placed in the compartment 2. In this preferred embodiment, the apparatus body 12 is built in the center console panel 2B placed between a driver seat and a passenger seat, and the front surface of the apparatus body 12 is exposed to the compartment 2.

As shown in FIG. 6, the main portion of the car audio system includes a reproducing portion 1002, tuner portion 1004, sound output portion 1006, operating portion 1010, display portion 1012, and control portion 1014.

The reproducing portion 1002 functions to reproduce data such as sound data recorded on the disk-shaped recording medium D such as CD, MD, and DVD, and to output a sound signal. As a modification, the reproducing portion 1002 may be replaced by a recording and reproducing portion for performing the recording and reproduction of data to/from the disk-shaped recording medium D.

The tuner portion 1004 functions to receive radio waves including AM waves and FM waves transmitted from radio stations, and to output a sound signal.

The sound output portion 1006 functions to perform predetermined signal processing including amplification to the sound signal supplied through the control portion 1014, and to supply an output signal to the speaker 18 built in the compartment 2, thus generating sounds from the speaker 18.

The operating portion 1010 is adapted to be operated to instruct the operations of the reproducing portion 1002, the tuner portion 1004, and the sound output portion 1006, and functions to supply a control signal to the control portion 1014 according to the operation performed to the operating portion 1010.

The display portion 1012 functions to display an operational condition of the reproducing portion 1002, the tuner portion 1004, and the sound output portion 1006 by means of characters, symbols, icons, or images under the control by the control portion 1014.

The control portion 1014 functions to perform the control of the reproducing portion 1002, the tuner portion 1004, the sound output portion 1006, the operating portion 1010, and the display portion 1012.

In this preferred embodiment, the reproducing portion 1002, the tuner portion 1004, the sound output portion 1006, and the control portion 1014 are included in the apparatus body 12, and the operating portion 1010 and the display portion 1012 are included in the front panel 16.

Further, a single motor 30 for actuating the drive mechanism 18 is included in the apparatus body 12. The operation of the motor 30 is controlled by the control portion 1014.

The drive mechanism 18 will now be described.

Figure 7:
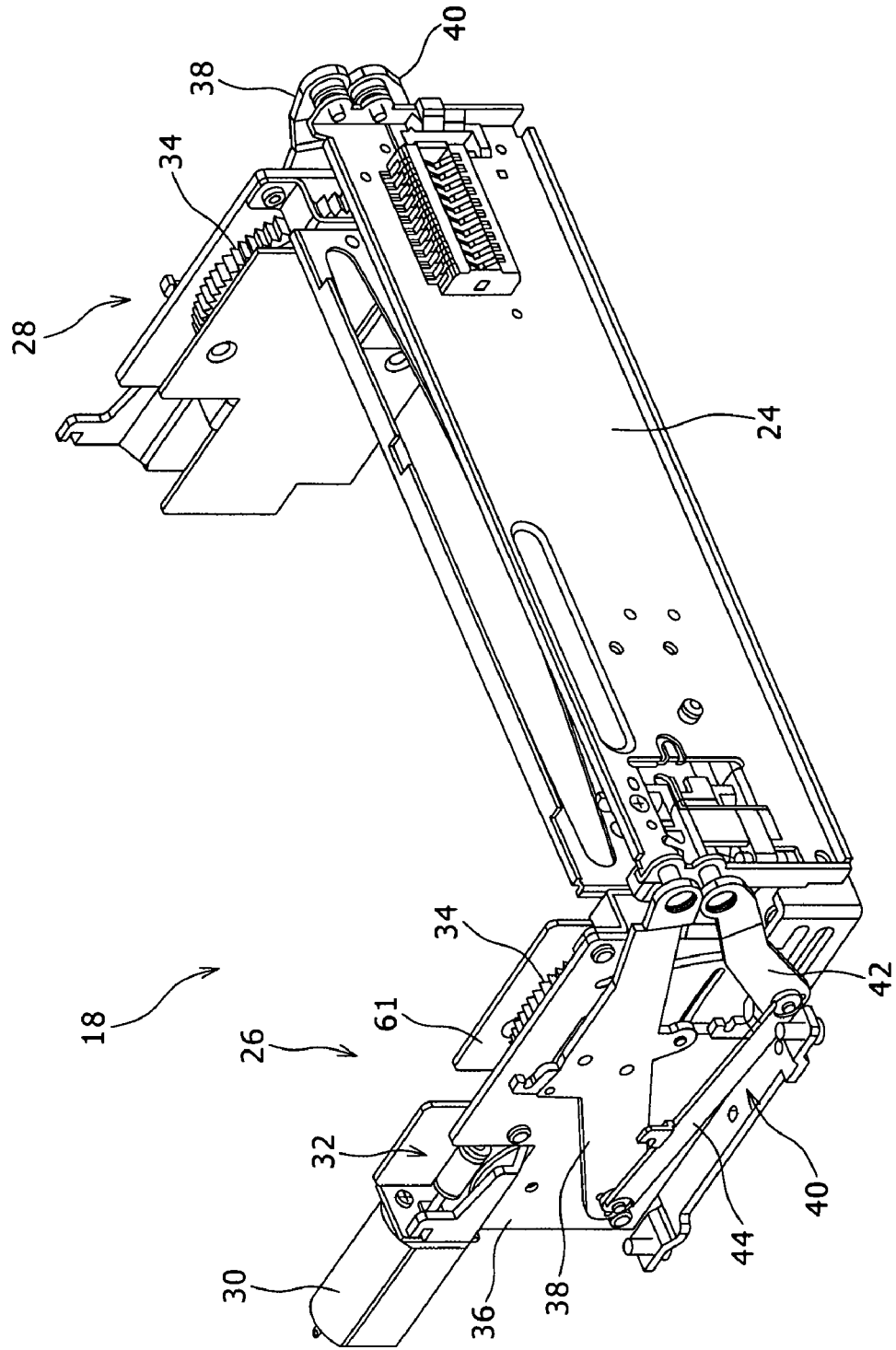
FIG. 7 is a perspective view of a drive mechanism.
Figure 8:
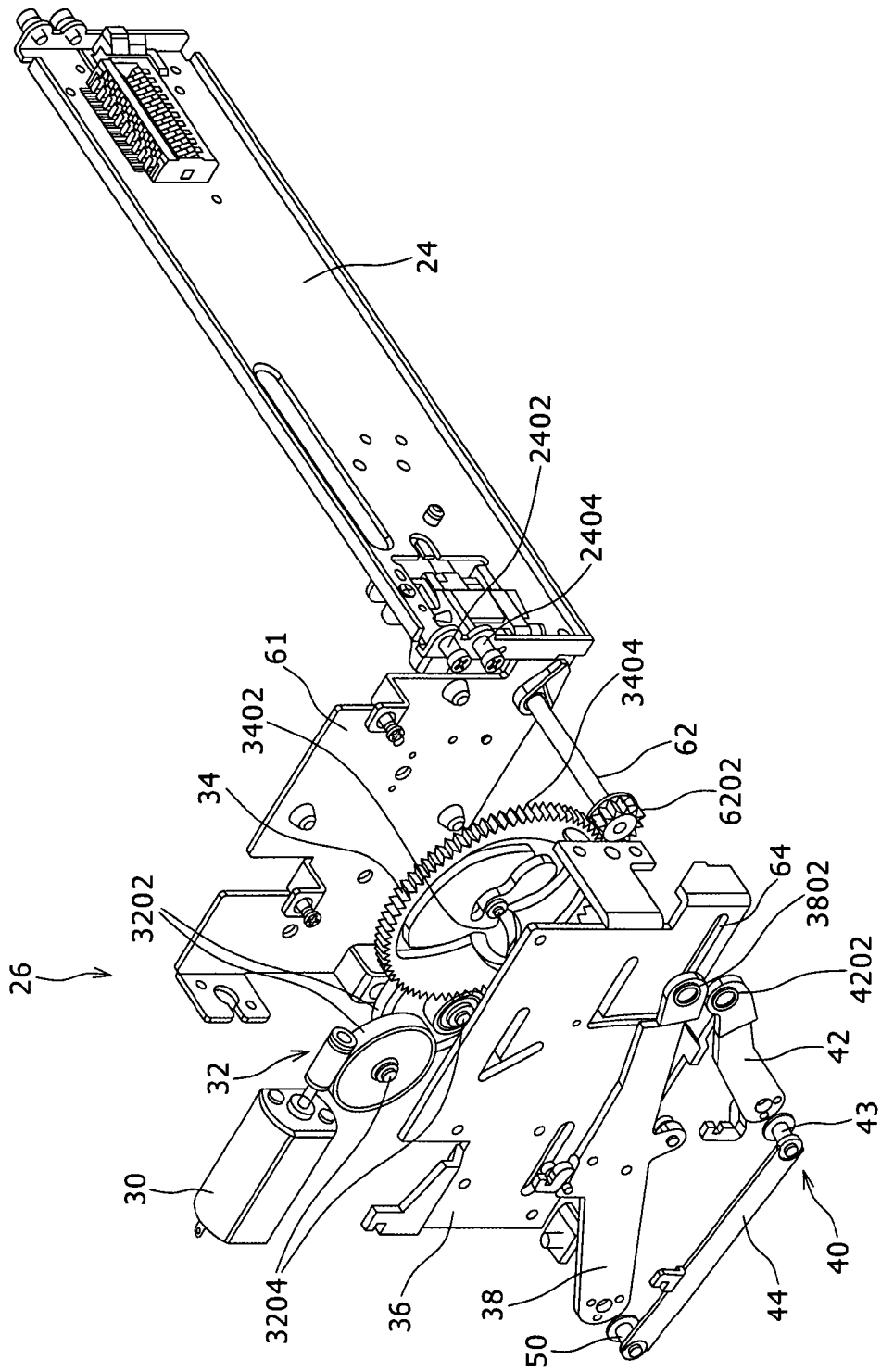
FIG. 8 is an exploded perspective view of a left drive mechanism.
Figure 9:
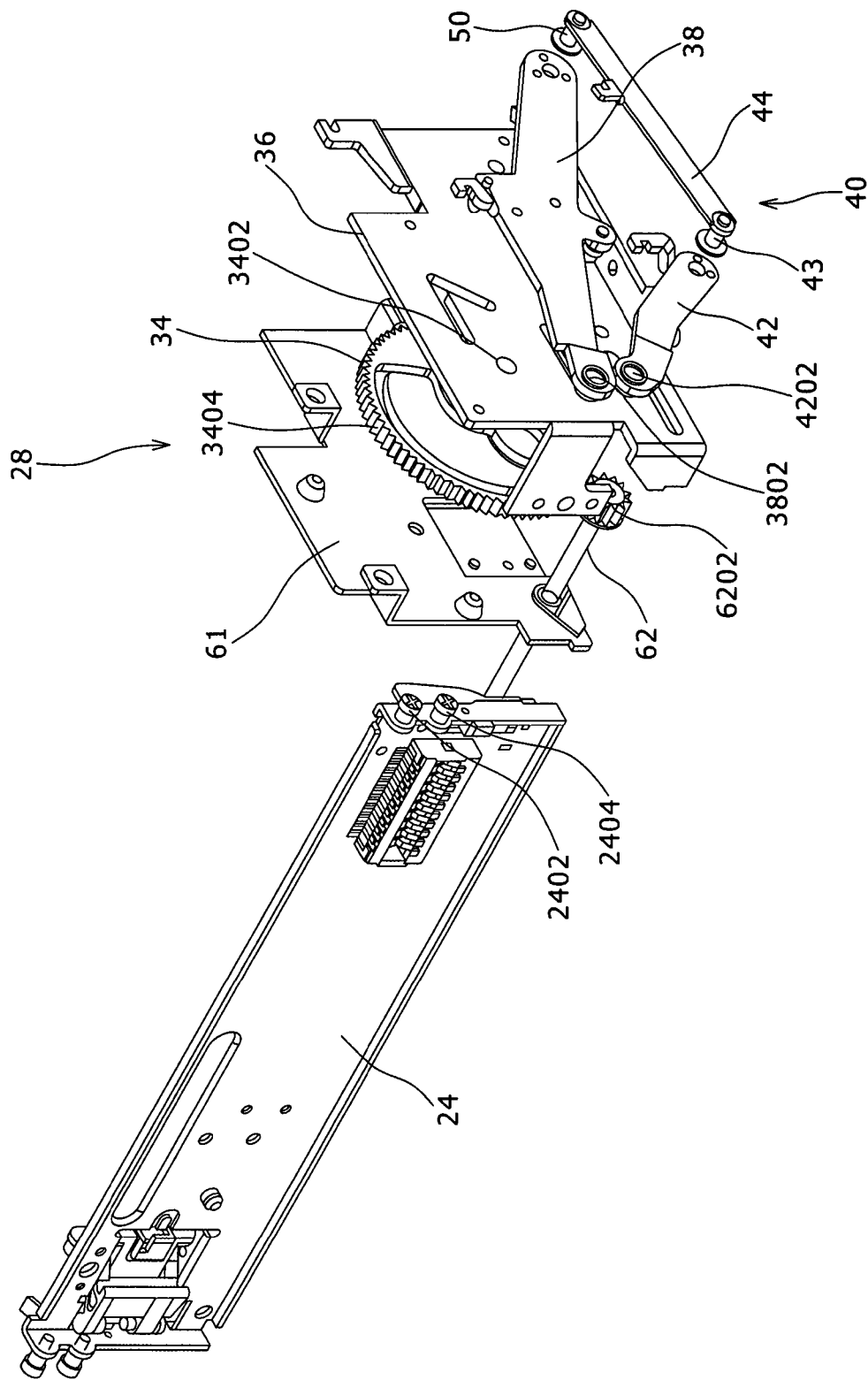
FIG. 9 is an exploded perspective view of a right drive mechanism.

FIG. 7 is a perspective view of the drive mechanism 18, FIG. 8 is an exploded perspective view of a left drive mechanism 26, and FIG. 9 is an exploded perspective view of a right drive mechanism 28.

The front panel 16 is detachably supported by a holder 24 connected to the drive mechanism 18.

Figure 2:
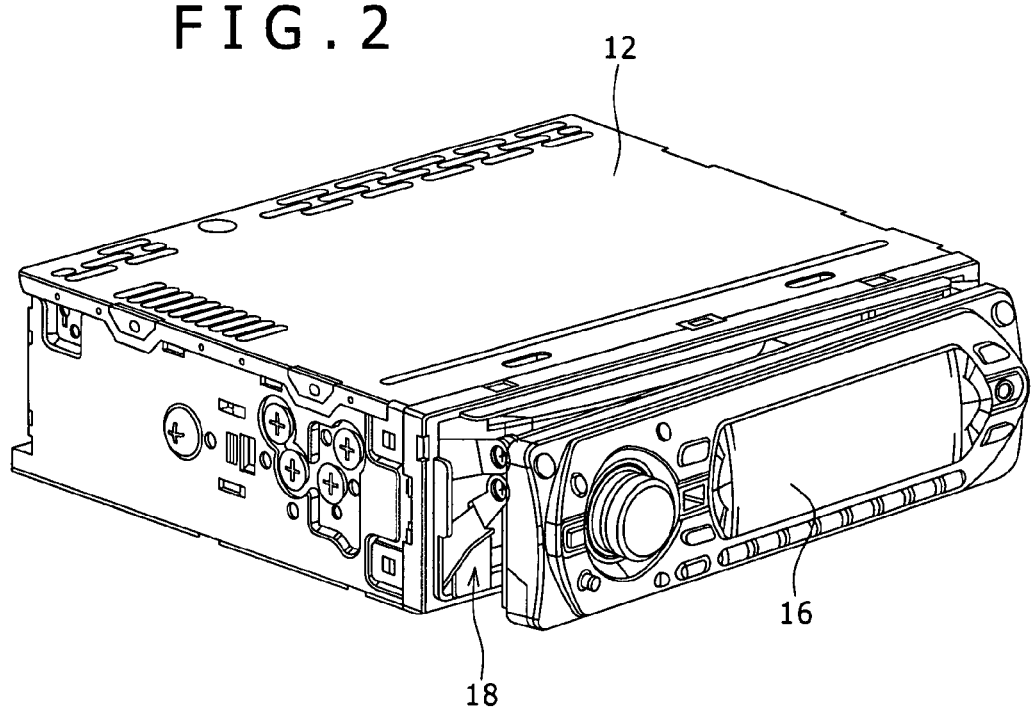
FIG. 2 is a perspective view of the in-vehicle apparatus in the condition that the front panel is in a left projected position.
Figure 3:
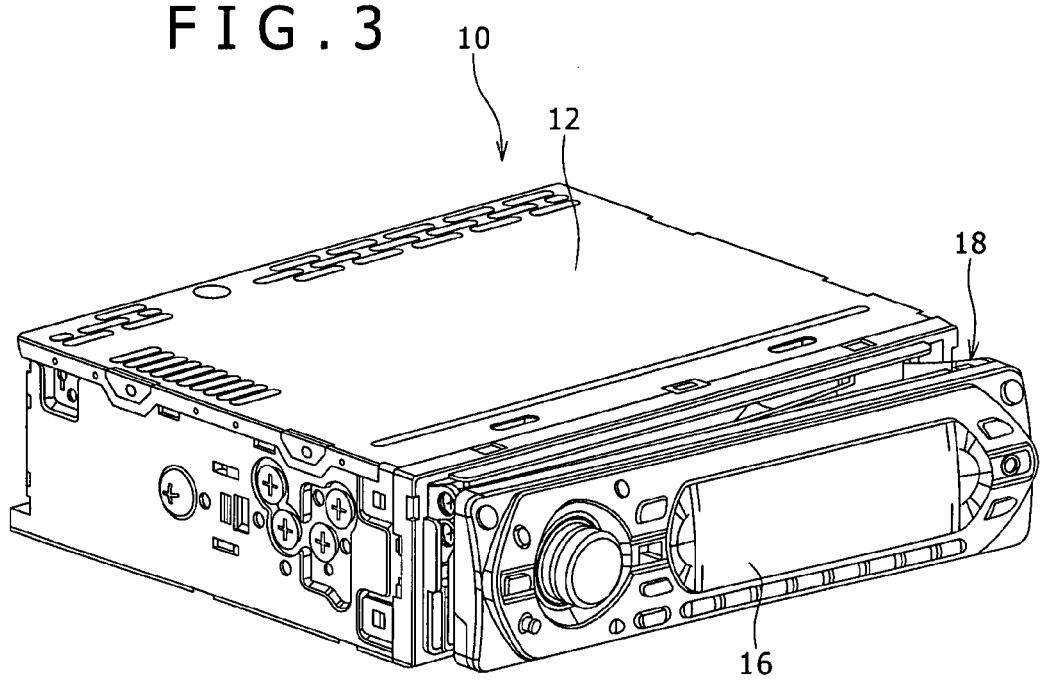
FIG. 3 is a perspective view of the in-vehicle apparatus in the condition that the front panel is in a right projected position.

The front panel 16 is movable to four positions by the drive mechanism 18. The four positions are a normal position where the front panel 16 is oriented in parallel to the front surface of the apparatus body 12 as shown in FIG. 1, a left projected position where a left side portion of the front panel 16 is projected frontward in comparison with a right side portion of the front panel 16 as shown in FIG. 2, a right projected position where the right side portion of the front panel 16 is projected frontward in comparison with the left side portion of the front panel 16 as shown in FIG. 3, and an open position where the front panel 16 is inclined frontward so as to open the loading slot 22.

In moving the front panel 16 to the four positions by the drive mechanism 18, the front panel 16 takes the normal position during the movement between the left projected position and the open position and also during the movement between the right projected position and the open position.

More specifically, the drive mechanism 18 has the motor 30, and when the motor 30 is operated in a forward direction, the front panel 16 is sequentially moved from the left projected position through the normal position, the open position, and the normal position to the right projected position in this order, whereas when the motor 30 is operated in a reverse direction, the front panel 16 is sequentially moved from the right projected position through the normal position, the open position, and the normal position to the left projected position in this order.

As shown in FIGS. 7 to 9, the drive mechanism 18 is composed of the left drive mechanism 26 and the right drive mechanism 28. The left drive mechanism 26 is provided at a left side portion of the apparatus body 12 and connected to a left side portion of the front panel 16. The right drive mechanism 28 is provided at a right side portion of the apparatus body 12 and connected to a right side portion of the front panel 16.

As shown in FIGS. 7 and 8, the left drive mechanism 26 includes the motor 30, gear train 32, cam plate 34, guide plate 36, first arm 38, and second arm 40.

As shown in FIG. 7, the guide plate 36 is located outside of the cam plate 34, and the first arm 38 and the second arm 40 are located outside of the guide plate 36.

A driving force of the motor 30 is transmitted through the gear train 32 to the cam plate 34 with the rotational speed being reduced by the gear train 32, and the cam plate 34 is rotatable in forward and reverse directions according to the operational directions of the motor 30.

As shown in FIGS. 8 and 9, a rotating shaft 62 extending in the lateral direction of the apparatus body 12 is provided on the front side of the cam plate 34. A gear 6202 mounted at the left end of the rotating shaft 62 is in mesh with a gear portion 3404 formed along the outer circumference of the cam plate 34. The rotational driving force of the motor 30 is transmitted through the rotating shaft 62 to the right drive mechanism 28. As similar to the left drive mechanism 26, the right drive mechanism 28 includes a cam plate 34, guide plate 36, first arm 38, and second arm 40. The rotating shaft 62 is provided on the front side of the cam plate 34 of the right drive mechanism 28. A gear 6202 mounted at the right end of the rotating shaft 62 is in mesh with a gear portion 3404 formed along the outer circumference of the cam plate 34 of the right drive mechanism 28. Accordingly, the cam plate 34 of the right drive mechanism 28 is rotated in the same direction as that of rotation of the cam plate 34 of the left drive mechanism 26.

As shown in FIG. 8, a plurality of gears 3202 constituting the gear train 32 are rotatably supported through a plurality of shafts 3204 to a plate 61 mounted on the housing 20. Further, the cam plate 34 is rotatably supported through a shaft 3402 to the plate 61.

Figure 22:
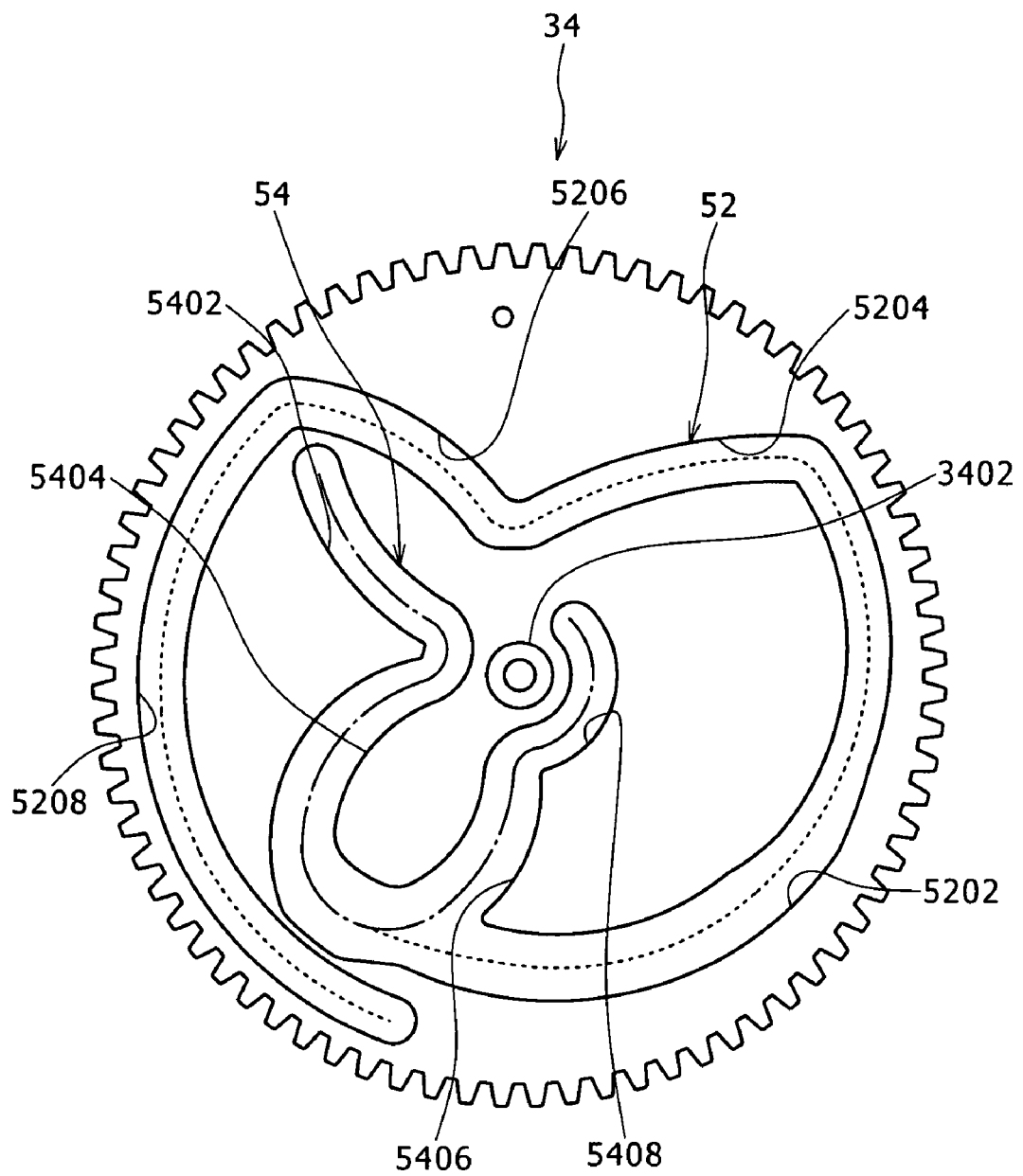
FIG. 22 is a plan view of a cam plate of the left drive mechanism.

FIGS. 10 to 16 are side views illustrating the operation of the left drive mechanism 26, and FIG. 22 is a plan view of the cam plate 34 of the left drive mechanism 26.

Figure 10:
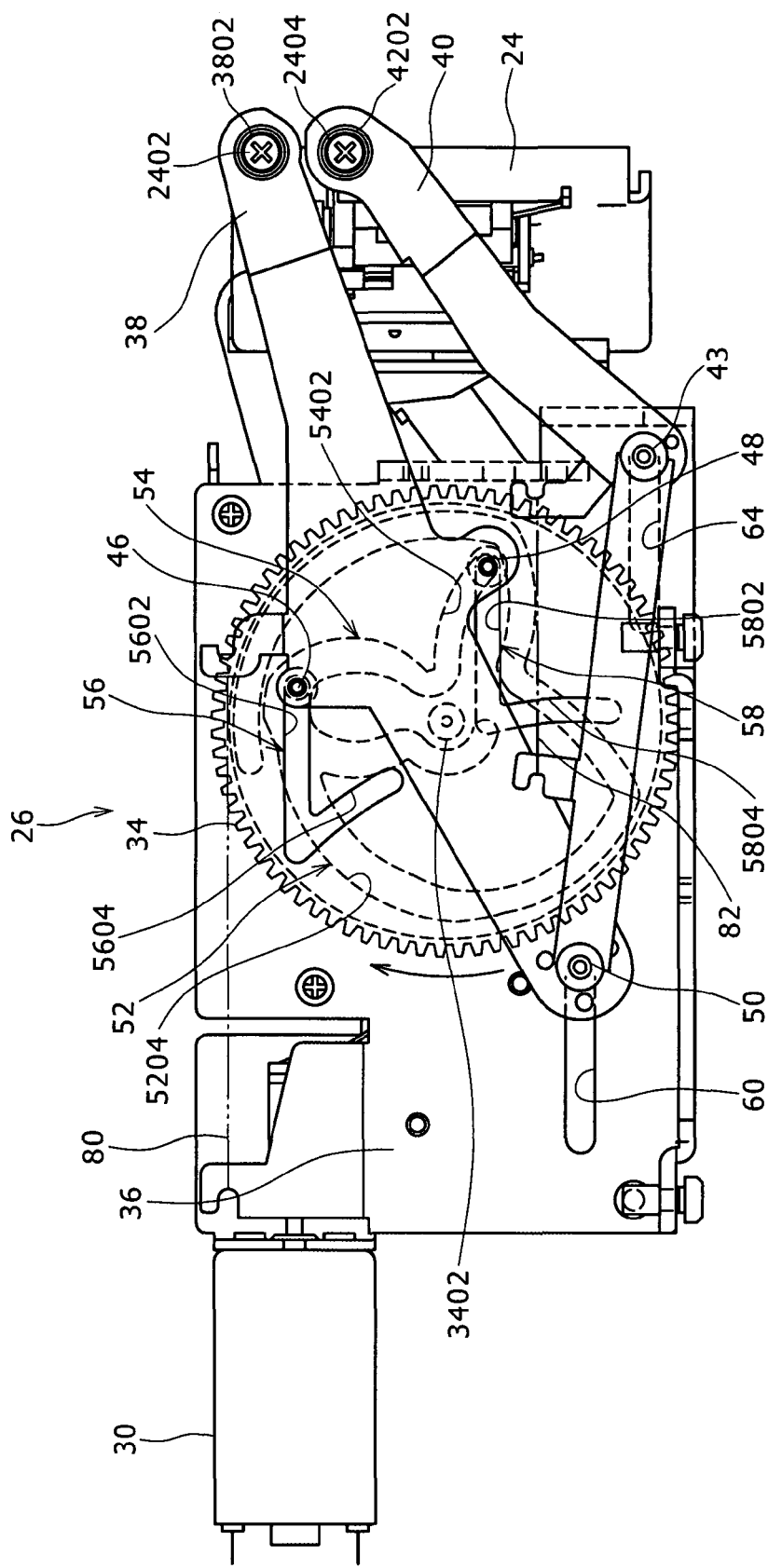
FIGS. 10 to 16 are side views illustrating the operation of the left drive mechanism.

As shown in FIG. 10, the first arm 38 extends in the longitudinal direction of the housing 20 on the left side thereof.

A first cam pin 46 and a second cam pin 48 are provided in a longitudinally intermediate portion of the first arm 38 at two opposite positions in a direction intersecting the longitudinal direction of the first arm 38.

A third cam pin 50 is provided at the rear end of the first arm 38 as one end of the first arm 38 in the longitudinal direction thereof.

As shown in FIGS. 8 and 10, the front end of the first arm 38 as the other end of the first arm 38 in the longitudinal direction thereof is pivotably connected through a spherical surface member 2402 and a spherical bearing surface 3802 to the left side portion of the holder 24.

As shown in FIGS. 10 and 22, the cam plate 34 has a first cam groove 52 engaged with the first cam pin 46 and a second cam groove 54 engaged with the second cam pin 48.

As shown in FIG. 10, the guide plate 36 has a third cam groove 56 engaged with the first cam pin 46, a fourth cam groove 58 engaged with the second cam pin 48, a fifth cam groove 60 engaged with the third cam pin 50, and a sixth cam groove 64 engaged with a fourth cam pin 43 which will be hereinafter described.

Thus, the first cam pin 46 is engaged with both the first cam groove 52 and the third cam groove 56, and the second cam pin 48 is engaged with both the second cam groove 54 and the fourth cam groove 58, thereby defining the motion of the first arm 38 by the rotation of the cam plate 34.

As shown in FIGS. 8 and 10, the second arm 40 extends between the holder 24 and the third cam pin 50.

The second arm 40 is composed of a front arm 42 and a rear arm 44. The rear end of the front arm 42 and the front end of the rear arm 44 are pivotably connected through the fourth cam pin 43. Accordingly, the second arm 40 is bendable at the longitudinally intermediate portion thereof corresponding to the connection between the front arm 42 and the rear arm 44.

The fourth cam pin 43 is engaged with the sixth cam groove 64 of the guide plate 36.

As shown in FIGS. 8 and 10, the front end of the second arm 40 as the other end of the second arm 40 in the longitudinal direction thereof (the front end of the front arm 42) is pivotably connected through a spherical surface member 2404 and a spherical bearing surface 4202 to the left side portion of the holder 24.

By the rotation of the cam plate 34, the second arm 40 is movable frontward and rearward with the intermediate portion being bendable about the fourth cam pin 43 as a pivot.

As shown in FIG. 10, the third cam groove 56 has a first guide portion 5602 and a second guide portion 5604.

The first guide portion 5602 extends in a first direction and functions to guide the first cam pin 46 in the first direction in cooperation with the first cam groove 52. In this preferred embodiment, the first direction is the same as the longitudinal direction of the housing 20.

The second guide portion 5604 extends in a second direction different from the first direction and functions to guide the first cam pin 46 in the second direction in cooperation with the first cam groove 52. In this preferred embodiment, the second direction is a slanting direction such that it is downward to the front side of the housing 20.

One end (rear end) of the first guide portion 5602 in the longitudinal direction thereof is connected with one end (rear end) of the second guide portion 5604 in the longitudinal direction thereof. In this preferred embodiment, the first guide portion 5602 and the second guide portion 5604 form a V-shape with an acute intersection angle.

As shown in FIG. 10, the fourth cam groove 58 has a third guide portion 5802 and a fourth guide portion 5804.

The third guide portion 5802 extends in a third direction and functions to guide the second cam pin 48 in the third direction in cooperation with the second cam groove 54. In this preferred embodiment, the third direction is the same as the longitudinal direction of the housing 20. parallel to the first direction.

The fourth guide portion 5804 extends in a fourth direction different from the third direction and functions to guide the second cam pin 48 in the fourth direction in cooperation with the second cam groove 54. In this preferred embodiment, the fourth direction is a slanting direction such that it is downward to the front side of the housing 20 at a slant angle larger than that of the third direction.

One end (rear end) of the third guide portion 5802 in the longitudinal direction thereof is connected with one end (rear end) of the fourth guide portion 5804 in the longitudinal direction thereof. In this preferred embodiment, the third guide portion 5802 and the fourth guide portion 5804 form a V-shape with an intersection. angle larger than that of the third cam groove 56.

Figure 12:
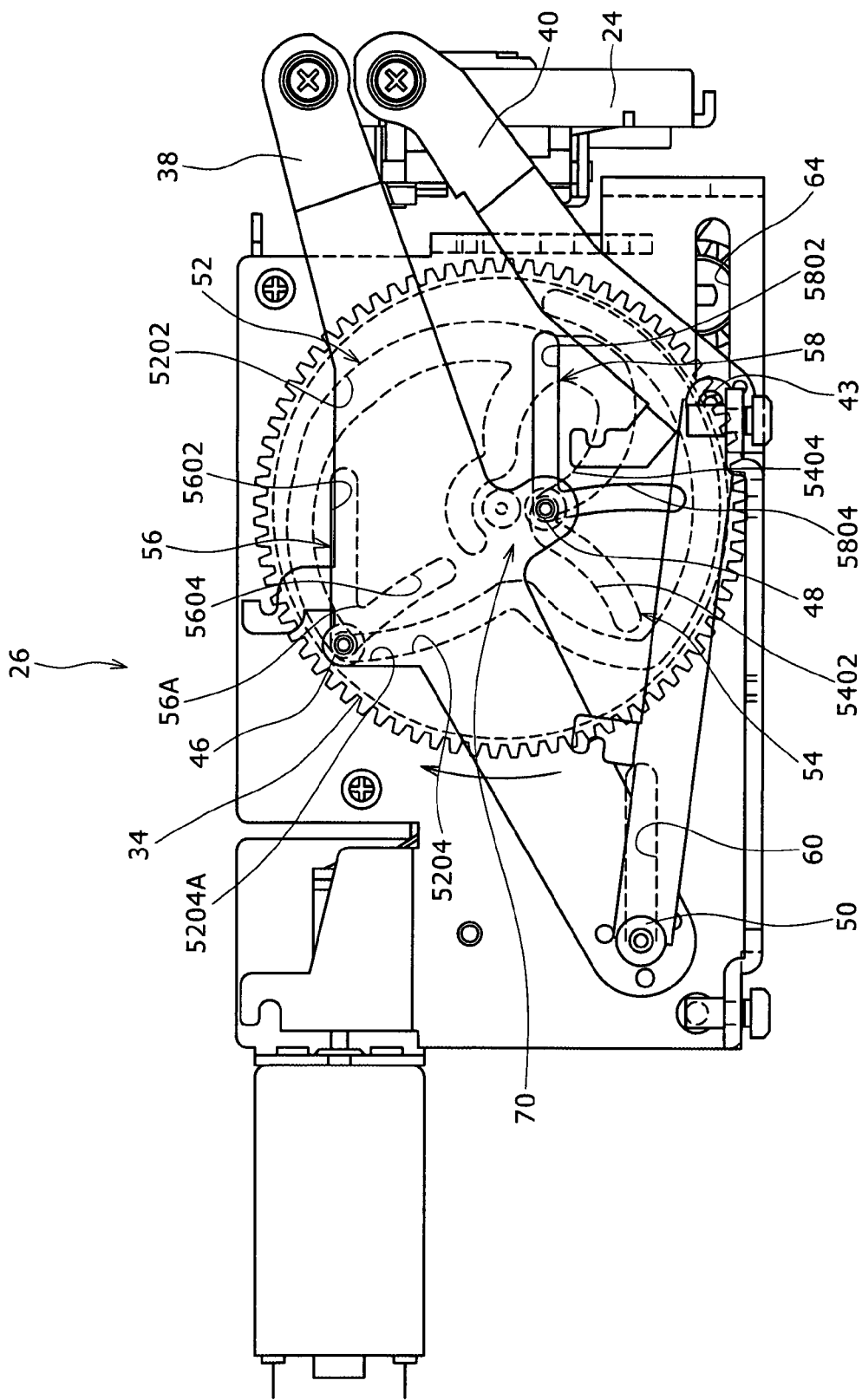

As shown in FIG. 12, the second cam groove 54 and the fourth cam groove 58 have a first cam pin guiding portion 70 for guiding the first cam pin 46 to either the first guide portion 5602 or the second guide portion 5604 by moving the first arm 38 through the second cam pin 48 when the first cam pin 46 comes to a position corresponding to the junction between the first guide portion 5602 and the second guide portion 5604.

In this preferred embodiment, the first cam pin guiding portion 70 includes the junction between the third guide portion 5802 and the fourth guide portion 5804 of the fourth cam groove 58.

The first cam groove 52 cooperates with the third cam groove 56 to impart a force to the first cam pin 46 mainly in the longitudinal direction of the housing 20.

As shown in FIG. 22, the first cam groove 52 has a first cam portion 5202, second cam portion 5204, third cam portion 5206, and fourth cam portion 5208.

In the forward rotation of the cam plate 34, the first cam portion 5202 guides the first cam pin 46 in cooperation with the third cam groove 56 in the first direction (in such a direction that the first cam pin 46 is moved toward the junction between the first guide portion 5602 and the second guide portion 5604), whereas in the reverse rotation of the cam plate 34, the first cam portion 5202 guides the first cam pin 46 in cooperation with the third cam groove 56 in the first direction (in such a direction that the first cam pin 46 is moved away from the junction between the first guide portion 5602 and the second guide portion 5604).

The second cam portion 5204 is connected to one end of the first cam portion 5202. In the forward rotation of the cam plate 34, the second cam portion 5204 guides the first cam pin 46 in cooperation with the third cam groove 56 in the second direction (in such a direction that the first cam pin 46 is moved away from the junction between the first guide portion 5602 and the second guide portion 5604), whereas in the reverse rotation of the cam plate 34, the second cam portion 5204 guides the first cam pin 46 in cooperation with the third cam groove 56 in the second direction (in such a direction that the first cam pin 46 is moved toward the junction between the first guide portion 5602 and the second guide portion 5604).

The third cam portion 5206 is connected to one end of the second cam portion 5204. In the forward rotation of the cam plate 34, the third cam portion 5206 guides the first cam pin 46 in cooperation with the third cam groove 56 in the second direction (in such a direction that the first cam pin 46 is moved toward the junction between the first guide portion 5602 and the second guide portion 5604), whereas in the reverse rotation of the cam plate 34, the third cam portion 5206 guides the first cam pin 46 in cooperation with the third cam groove 56 in the second direction (in such a direction that the first cam pin 46 is moved away from the junction between the first guide portion 5602 and the second guide portion 5604).

The fourth cam portion 5208 is connected to one end of the third cam portion 5206. In both the forward rotation and the reverse rotation of the cam plate 34, the fourth cam portion 5208 makes the first cam pin 46 stayed at the junction between the first guide portion, 5602 and the second guide portion 5604 in cooperation with the third cam groove 56.

As shown in FIG. 22, the second cam groove 54 has a fifth cam portion 5402, sixth cam portion 5404, seventh cam portion 5406, and eighth cam portion 5408.

In the forward rotation of the cam plate 34, the fifth cam portion 5402 guides the second cam pin 48 in cooperation with the fourth cam groove 58 in the third direction (in such a direction that the second cam pin 48 is moved toward the junction between the third guide portion 5802 and the fourth guide portion 5804), whereas in the reverse rotation of the cam plate 34, the fifth cam portion 5402 guides the second cam pin 48 in cooperation with the fourth cam groove 58 in the third direction (in such a direction that the second cam pin 48 is moved away from the junction between the third guide portion 5802 and the fourth guide portion 5804).

The sixth cam portion 5404 is connected to one end of the fifth cam portion 5402. In the forward rotation of the cam plate 34, the sixth cam portion 5404 guides the second cam pin 48 in cooperation with the fourth cam groove 58 in the fourth direction (in such a direction that the second cam pin 48 is moved away from the junction between the third guide portion 5802 and the fourth guide portion 5804), whereas in the reverse rotation of the cam plate 34, the sixth cam portion 5404 guides the second cam pin 48 in cooperation with the fourth cam groove 58 in the fourth direction (in such a direction that the second cam pin 48 is moved toward the junction between the third guide portion 5802 and the fourth guide portion 5804).

The seventh cam portion 5406 is connected to one end of the sixth cam portion 5404. In the forward rotation of the cam plate 34, the seventh cam portion 5406 guides the second cam pin 48 in cooperation with the fourth cam groove 58 in the fourth direction (in such a direction that the second cam pin 48 is moved toward the junction between the third guide portion 5802 and the fourth guide portion 5804), whereas in the reverse rotation of the cam plate 34, the seventh cam portion 5806 guides the second cam pin 48 in cooperation with the fourth cam groove 58 in the fourth direction (in such a direction that the second cam pin 48 is moved away from the junction between the third guide portion 5802 and the fourth guide portion 5804).

The eighth cam portion 5408 is connected to one end of the seventh cam portion 5406. In both the forward rotation and the reverse rotation of the cam plate 34, the eighth cam portion 5408 makes the second cam pin 48 stayed at the junction between the third guide portion 5802 and the fourth guide portion 5804 in cooperation with the fourth cam groove 58.

In this preferred embodiment, the first cam pin 46 engaged with the first cam groove 52 has the same outer diameter as that of the second cam pin 48 engaged with the second cam groove 54. The first cam groove 52 and the second cam groove 54 communicate with each other.

The fifth cam groove 60 engaged with the third cam pin 50 is formed at a rear lower portion of the guide plate 36 so as to extend in the longitudinal direction of the housing 20.

The sixth cam groove 64 engaged with the fourth cam pin 43 is formed at a front lower portion of the guide plate 36 so as to extend in the longitudinal direction of the housing 20.

When the motor 30 is operated in the forward direction to rotate the cam plate 34 in the condition where the first cam pin 46 is present at the junction between the first guide portion 5602 and the second guide portion 5604 as shown in FIG. 12, a wall surface 5204A of the second cam portion 5204 of the first cam groove 52 which portion extends substantially in the vertical direction comes into abutment against the first cam pin 46, thereby imparting a frontward moving force to the first cam pin 46.

Accordingly, there is a possibility that the first cam pin 46 may come into abutment against a wall portion 56A at the junction between the first guide portion 5602 and the second guide portion 5604, causing the stop of the rotation of the cam plate 34.

To cope with this possibility, the first cam pin guiding portion 70 is provided so that the second cam pin 48 is moved by the second cam groove 54 and the fourth cam groove 58 to thereby move the first arm 38, resulting in that the first cam pin 46 is guided into the second guide portion 5604, which is a target groove to be engaged with the first cam pin 46 by the forward rotation of the cam plate 34.

More specifically, the first cam pin guiding portion 70 in the left drive mechanism 26 includes the junction between the fifth cam portion 5402 and the sixth cam portion 5404 of the second cam groove 54 and the junction between the third guide portion 5802 and the fourth guide portion 5804 of the fourth cam groove 58.

As shown by a phantom line in FIG. 10, a coil spring 80 is arbitrarily provided between the first arm 38 and the guide plate 36 to remove the play of the first arm 38. Further, as shown by another phantom line in FIG. 10, a coil spring 82 is arbitrarily provided between the front arm 42 and the rear arm 44 to remove the play of the front arm 42 and the rear arm 44.

Figure 23:
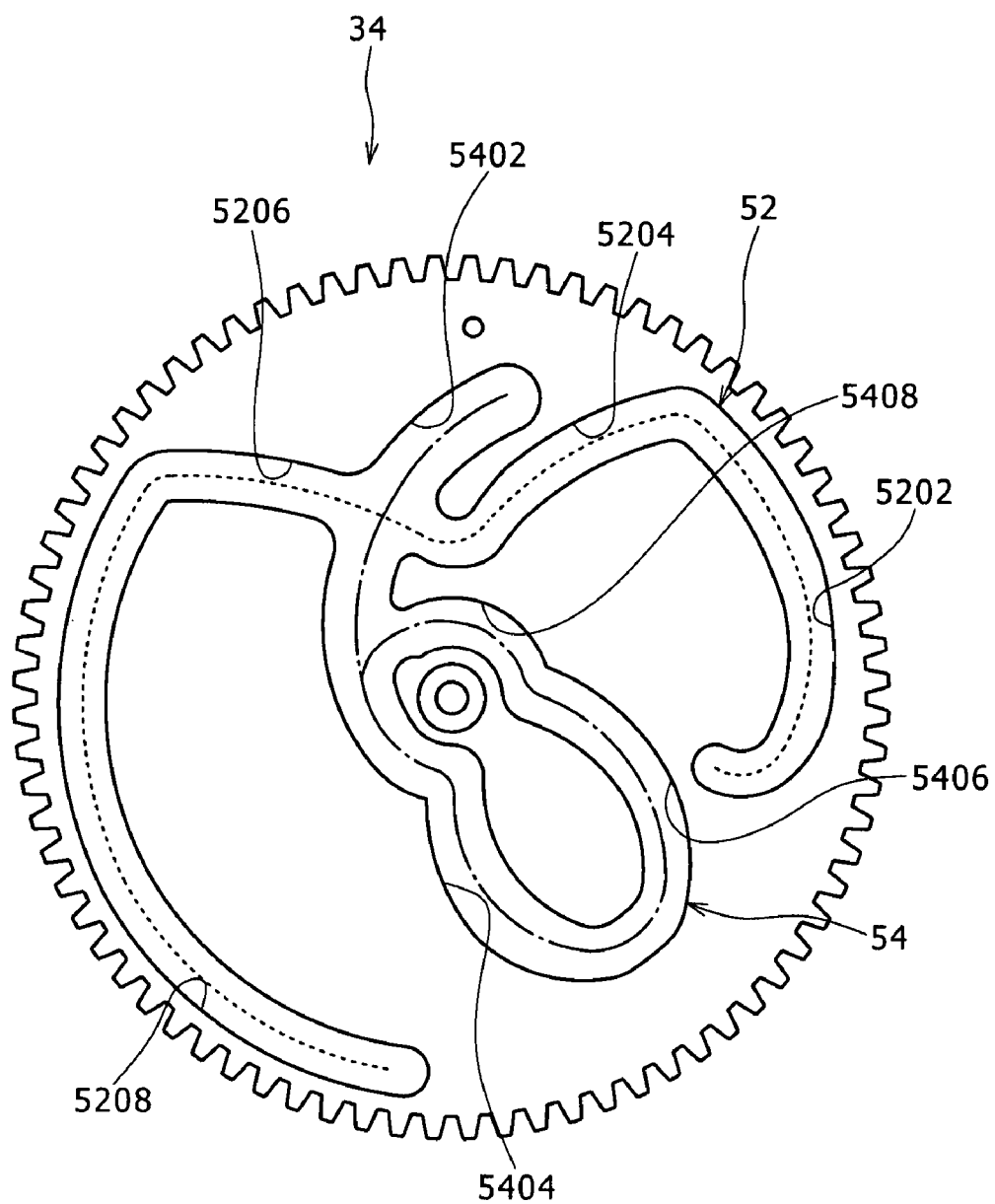
FIG. 23 is a plan view of a cam plate of the right drive mechanism.

FIGS. 17 to 21 are side views illustrating the operation of the right drive mechanism 28, and FIG. 23 is a plan view of the cam plate 34 of the right drive mechanism 28.

As shown in FIGS. 7 and 9, the right drive mechanism 28 includes the cam plate 34, the guide plate 36, the first arm 38, and the second arm 40 as in the left drive mechanism 26 as mentioned above.

As shown in FIG. 9, the guide plate 36 is located outside of the cam plate 34, and the first arm 38 and the second arm 40 are located outside of the guide plate 36.

The cam plate 34 is rotatably supported through a shaft 3402 to a plate 61 mounted on the housing 20.

Figure 17:
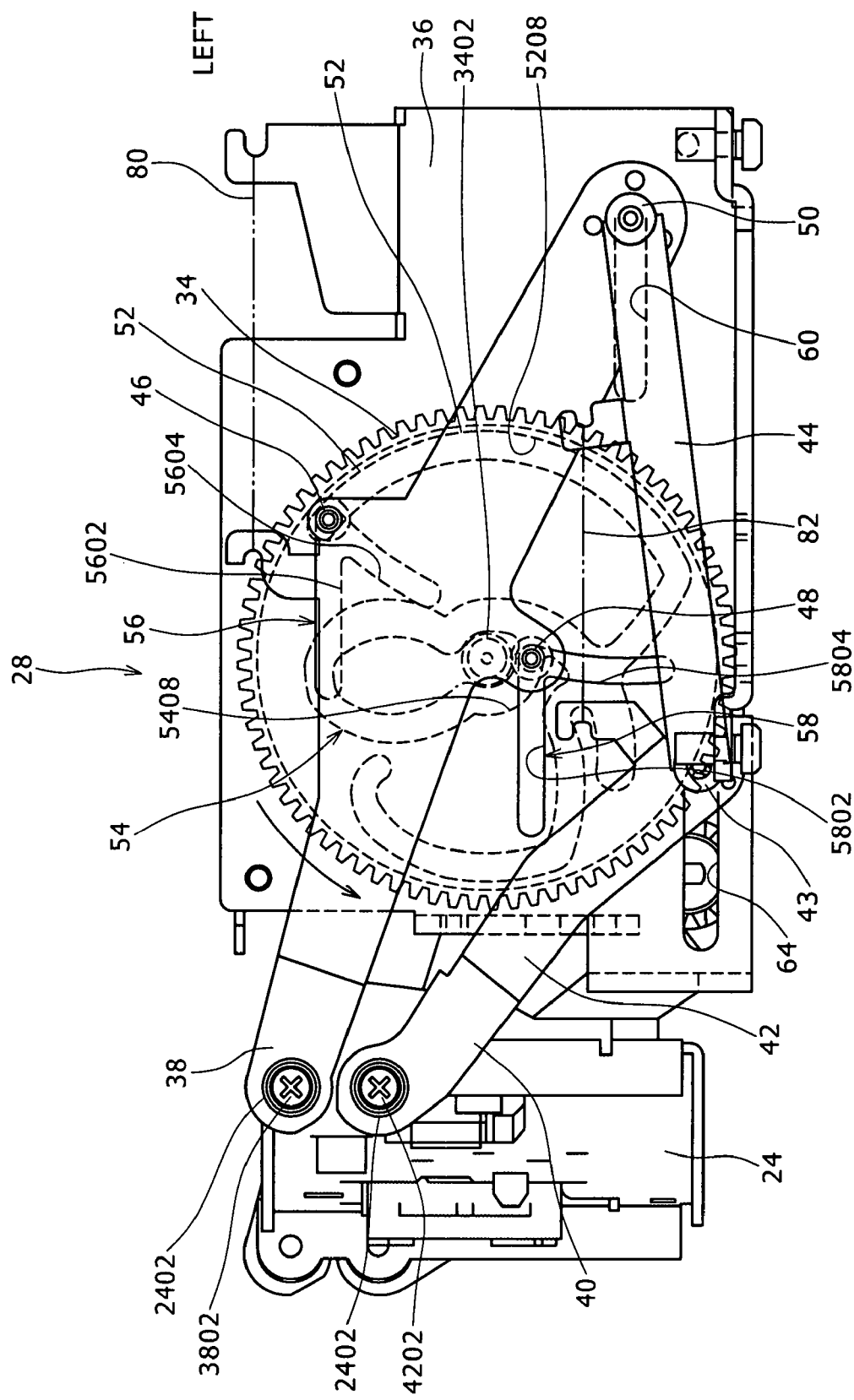
FIGS. 17 to 21 are side views illustrating the operation of the right drive mechanism.

As shown in FIG. 17, the first arm 38 extends in the longitudinal direction of the housing 20 on the right side thereof.

A first cam pin 46 and a second cam pin 48 are provided in a longitudinally intermediate portion of the first arm 38 at two opposite positions in a direction intersecting the longitudinal direction of the first arm 38.

A third cam pin 50 is provided at the rear end of the first arm 38 as one end of the first arm 38 in the longitudinal direction thereof.

As shown in FIGS. 9 and 17, the front end of the first arm 38 as the other end of the first arm 38 in the longitudinal direction thereof is pivotably connected through a spherical surface member 2402 and a spherical bearing surface 3802 to the right side portion of the holder 24.

As shown in FIGS. 17 and 23, the cam plate 34 has a first cam groove 52 engaged with the first cam pin 46 and a second cam groove 54 engaged with the second cam pin 48.

As shown in FIG. 17, the guide plate 36 has a third cam groove 56 engaged with the first cam pin 46, a fourth cam groove 58 engaged with the second cam pin 48, a fifth cam groove 60 engaged with the third cam pin 50, and a sixth cam groove 64 engaged with a fourth cam pin 43 which will be hereinafter described.

Thus, the first cam pin 46 is engaged with both the first cam groove 52 and the third cam groove 56, and the second cam pin 48 is engaged with both the second cam groove 54 and the fourth cam groove 58, thereby defining the motion of the first arm 38 by the rotation of the cam plate 34.

As shown in FIGS. 9 and 17, the second arm 40 extends between the holder 24 and the third cam pin 50.

The second arm 40 is composed of a front arm 42 and a rear arm 44. The rear end of the front arm 42 and the front end of the rear arm 44 are pivotably connected through the fourth cam pin 43. Accordingly, the second arm 40 is bendable at the longitudinally intermediate portion thereof corresponding to the connection between the front arm 42 and the rear arm 44.

The fourth cam pin 43 is engaged with the sixth cam groove 64 of the guide plate 36.

As shown in FIGS. 9 and 17, the front end of the second arm 40 as the other end of the second arm 40 in the longitudinal direction thereof (the front end of the front arm 42) is pivotably connected through a spherical surface member 2404 and a spherical bearing surface 4202 to the right side portion of the holder 24.

By the rotation of the cam plate 34, the second arm 40 is movable frontward and rearward with the intermediate portion being bendable about the fourth cam pin 43 as a pivot.

As shown in FIG. 17, the third cam groove 56 has a first guide portion 5602 and a second guide 5604.

The first guide portion 5602 extends in a first direction and functions to guide the first cam pin 46 in the first direction in cooperation with the first cam groove 52. In this preferred embodiment, the first direction is the same as the longitudinal direction of the housing 20.

The second guide portion 5604 extends in a second direction different from the first direction and functions to guide the first cam pin 46 in the second direction in cooperation with the first cam groove 52. In this preferred embodiment, the second direction is a slanting direction such that it is downward to the front side of the housing 20.

One end (rear end) of the first guide portion 5602 in the longitudinal direction thereof is connected with one end (rear end) of the second guide portion 5604 in the longitudinal direction thereof. In this preferred embodiment, the first guide portion 5602 and the second guide portion 5604 form a V-shape with an acute intersection angle.

As shown in FIG. 17, the fourth cam groove 58 has a third guide portion 5802 and a fourth guide portion 5804.

The third guide portion 5802 extends in a third direction and functions to guide the second cam pin 48 in the third direction in cooperation with the second cam groove 54. In this preferred embodiment, the third direction is the same as the longitudinal direction of the housing 20 parallel to the first direction.

The fourth guide portion 5804 extends in a fourth direction different from the third direction and functions to guide the second cam pin 48 in the fourth direction in cooperation with the second cam groove 54. In this preferred embodiment, the fourth direction is a slanting direction such that it is downward to the front side of the housing 20 at a slant angle larger than that of the third direction.

One end (rear end) of the third guide portion 5802 in the longitudinal direction thereof is connected with one end (rear end) of the fourth guide portion 5804 in the longitudinal direction thereof. In this preferred embodiment, the third guide portion 5802 and the fourth guide portion 5804 form a V-shape with an intersection angle larger than that of the third cam groove 56.

Figure 18:
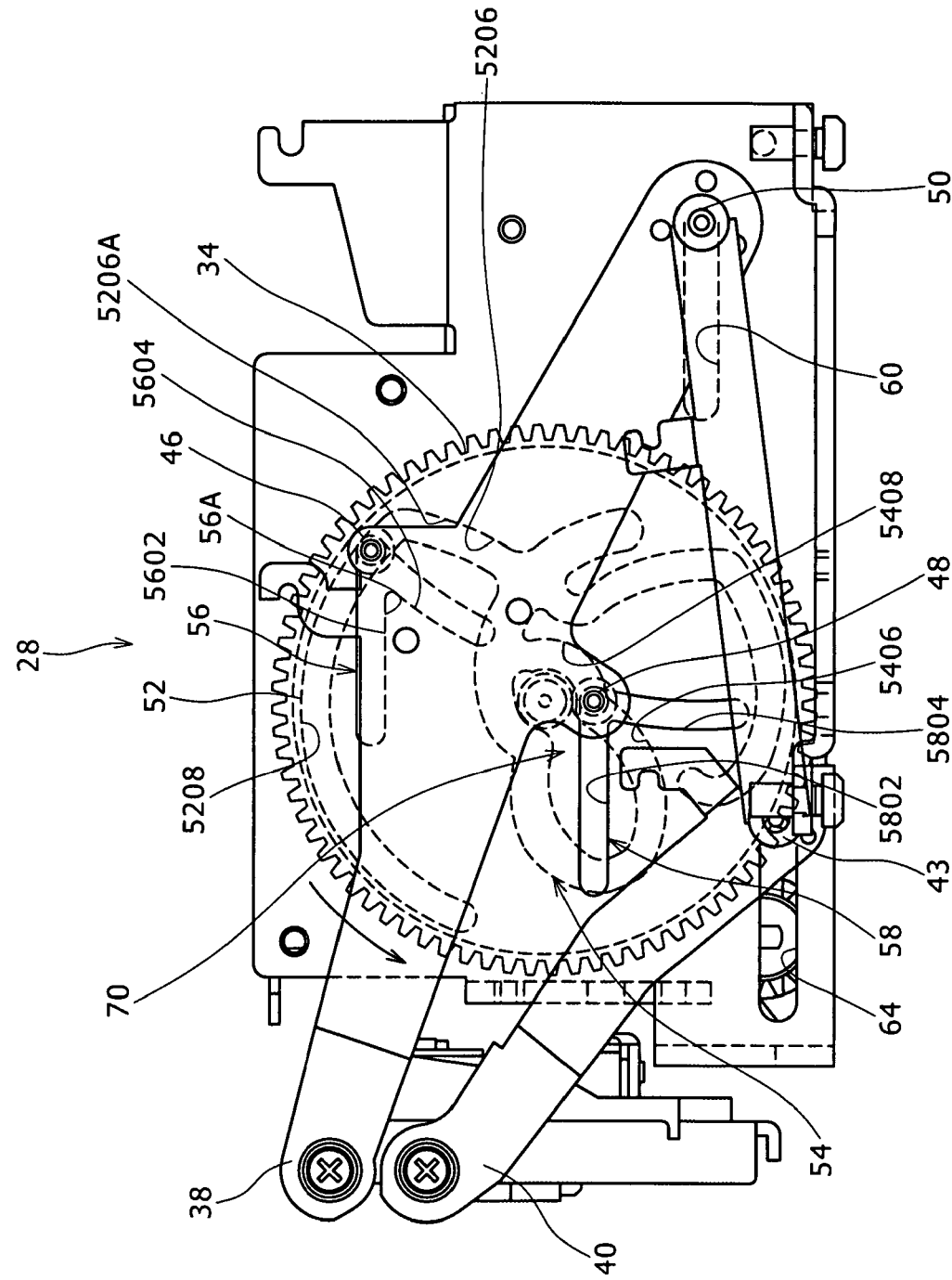

As shown in FIG. 18, the second cam groove 54 and the fourth cam groove 58 have a first cam pin guiding portion 70 for guiding the first cam pin 46 to either the first guide portion 5602 or the second guide portion 5604 by moving the first arm 38 through the second cam pin 48 when the first cam pin 46 comes to a position corresponding to the junction between the first guide portion 5602 and the second guide portion 5604.

In this preferred embodiment, the first cam pin guiding portion 70 includes the junction between the third guide portion 5802 and the fourth guide portion 5804 of the fourth cam groove 58.

The first cam groove 52 cooperates with the third cam groove 56 to impart a force to the first cam pin 46 mainly in the longitudinal direction of the housing 20.

As shown in FIG. 23, the first cam groove 52 has a first cam portion 5202, second cam portion 5204, third cam portion 5206, and fourth cam portion 5208.

In the forward rotation of the cam plate 34, the first cam portion 5202 guides the first cam pin 46 in cooperation with the third cam groove 56 in the first direction (in such a direction that the first cam pin 46 is moved away from the junction between the first guide portion 5602 and the second guide portion 5604), whereas in the reverse rotation of the cam plate 34, the first cam portion 5202 guides the first cam pin 46 in cooperation with the third cam groove 56 in the first direction (in such a direction that the first cam pin 46 is moved toward the junction between the first guide portion 5602 and the second guide portion 5604).

The second cam portion 5204 is connected to one end of the first cam portion 5202. In the forward rotation of the cam plate 34, the second cam portion 5204 guides the first cam pin 46 in cooperation with the third cam groove 56 in the second direction (in such a direction that the first cam pin 46 is moved toward the junction between the first guide portion 5602 and the second guide portion 5604), whereas in the reverse rotation of the cam plate 34, the second cam portion 5204 guides the first cam pin 46 in cooperation with the third cam groove 56 in the second direction (in such a direction that the first cam pin 46 is moved away from the junction between the first guide portion 5602 and the second guide portion 5604).

The third cam portion 5206 is connected to one end of the second cam portion 5204. In the forward rotation of the cam plate 34, the third cam portion 5206 guides the first cam pin 46 in cooperation with the third cam groove 56 in the second direction (in such a direction that the first cam pin 46 is moved away from the junction between the first guide portion 5602 and the second guide portion 5604), whereas in the reverse rotation of the cam plate 34, the third cam portion 5206 guides the first cam pin 46 in cooperation with the third cam groove 56 in the second direction (in such a direction that the first cam pin 46 is moved toward the junction between the first guide portion 5602 and the second guide portion 5604).

The fourth cam portion 5208 is connected to one end of the third cam portion 5206. In both the forward rotation and the reverse rotation of the cam plate 34, the fourth cam portion 5208 makes the first cam pin 46 stayed at the junction between the first guide portion 5602 and the second guide portion 5604 in cooperation with the third cam groove 56.

As shown in FIG. 23, the second cam groove 54 has a fifth cam portion 5402, sixth cam portion 5404, seventh cam portion 5406, and eighth cam portion 5408.

In the forward rotation of the cam plate 34, the fifth cam portion 5402 guides the second cam pin 48 in cooperation with the fourth cam groove 58 in the third direction (in such a direction that the second cam pin 48 is moved away from the junction between the third guide portion 5802 and the fourth guide portion 5804), whereas in the reverse rotation of the cam plate 34, the fifth cam portion 5402 guides the second cam pin 48 in cooperation with the fourth cam groove 58 in the third direction (in such a direction that the second cam pin 48 is moved toward the junction between the third guide portion 5802 and the fourth guide portion 5804).

The sixth cam portion 5404 is connected to one end of the fifth cam portion 5402. In the forward rotation of the cam plate 34, the sixth cam portion 5404 guides the second cam pin 48 in cooperation with the fourth cam groove 58 in the fourth direction (in such a direction that the second cam pin 48 is moved toward the junction between the third guide portion 5802 and the fourth guide portion 5804), whereas in the reverse rotation of the cam plate 34, the sixth cam portion 5404 guides the second cam pin 48 in cooperation with the fourth cam groove 58 in the fourth direction (in such a direction that the second cam pin 48 is moved away from the junction between the third guide portion 5802 and the fourth guide portion 5804).

The seventh cam portion 5406 is connected to one end of the sixth cam portion 5404. In the forward rotation of the cam plate 34, the seventh cam portion 5406 guides the second cam pin 48 in cooperation with the fourth cam groove 58 in the fourth direction (in such a direction that the second cam pin 48 is moved away from the junction between the third guide portion 5802 and the fourth guide portion 5804), whereas in the reverse rotation of the cam plate 34, the seventh cam portion 5806 guides the second cam pin 48 in cooperation with the fourth cam groove 58 in the fourth direction (in such a direction that the second cam pin 48 is moved toward the junction between the third guide portion 5802 and the fourth guide portion 5804).

The eighth cam portion 5408 is connected to one end of the seventh cam portion 5406. In both the forward rotation and the reverse rotation of the cam plate 34, the eighth cam portion 5408 makes the second cam pin 48 stayed at the junction between the third guide portion 5802 and the fourth guide portion 5804 in cooperation with the fourth cam groove 58.

In this preferred embodiment, the first cam pin 46 engaged with the first cam groove 52 has the same outer diameter as that of the second cam pin 48 engaged with the second cam groove 54. The first cam groove 52 and the second cam groove 54 communicate with each other.

The fifth cam groove 60 engaged with the third cam pin 50 is formed at a rear lower portion of the guide plate 36 so as to extend in the longitudinal direction of the housing 20.

The sixth cam groove 64 engaged with the fourth cam pin 43 is formed at a front lower portion of the guide plate 36 so as to extend in the longitudinal direction of the housing 20.

When the motor 30 is operated in the forward direction to rotate the cam plate 34 in the condition where the first cam pin 46 is present at the junction between the first guide portion 5602 and the second guide portion 5604 as shown in FIG. 18, a wall surface 5206A of the third cam portion 5206 of the first cam groove 52 which portion extends substantially in the vertical direction comes into abutment against the first cam pin 46, thereby imparting a frontward moving force to the first cam pin 46.

Accordingly, there is a possibility that the first cam pin 46 may come into abutment against a wall portion 56A at the junction between the first guide portion 5602 and the second guide portion 5604, causing the stop of the rotation of the cam plate 34.

To cope with this possibility, the first cam pin guiding portion 70 is provided so that the second cam pin 48 is moved by the second cam groove 54 and the fourth cam groove 58 to thereby move the first arm 38, resulting in that the first cam pin 46 is guided into the second guide portion 5604, which is a target groove to be engaged with the first cam pin 46 by the forward rotation of the cam plate 34.

More specifically, the first cam pin guiding portion 70 in the right drive mechanism 28 includes the junction between the eighth cam portion 5408 and the seventh cam portion 5406 of the second cam groove 54 and the junction between the third guide portion 5802 and the fourth guide portion 5804 of the fourth cam groove 58.

As shown by a phantom line in FIG. 17, a coil spring 80 is arbitrarily provided between the first arm 38 and the guide plate 36 to remove the play of the first arm 38.

Further, as shown by another phantom line in FIG. 17, a coil spring 82 is arbitrarily provided between the front arm 42 and the rear arm 44 to remove the play of the front arm 42 and the rear arm 44.

In this preferred embodiment, the normal position of the front panel 16 is formed in the condition where the first and second arms 38 and 40 of the left drive mechanism 26 are in the normal position and the first and second arms 38 and 40 of the right drive mechanism 28 are also in the normal position. The left projected position of the front panel 16 is formed in the condition where the first and second arms 38 and 40 of the left drive mechanism 26 are in the projected position and the first and second arms 38 and 40 of the right drive mechanism 28 are in the normal position. The right projected position of the front panel 16 is formed in the condition where the first and second arms 38 and 40 of the left drive mechanism 26 are in the normal position and the first and second arms 38 and 40 of the right drive mechanism 28 are in the projected position. The open position of the front panel 16 is formed in the condition where the first and second arms 38 and 40 of the left drive mechanism 26 are in the open position and the first and second arms 38 and 40 of the right drive mechanism 28 are also in the open position.

The operation of this preferred embodiment will now be described.

The operation of the motor 30 in the forward and reverse directions and the start and stop of the operation of the motor 30 are controlled by the control portion 1014.

(Left Projected Position)

The left projected position of the front panel 16 as shown in FIG. 2 will now be described.

The operation of the left drive mechanism 26 will now be described.

In the left projected position of the front panel 16, the first and second arms 38 and 40 of the left drive mechanism 26 are in the projected position. As shown in FIG. 10, the first cam pin 46 of the first arm 38 is present at one end of the first cam portion 5202 of the first cam groove 52 of the cam plate 34 and present also at the front end of the first guide portion 5602 of the third cam groove 56 of the guide plate 36.

The second cam pin 48 of the first arm 38 is present at one end of the fifth cam portion 5402 of the second cam groove 54 of the cam plate 34 and present also at the front end of the third guide portion 5802 of the fourth cam groove 58 of the guide plate 36.

The third cam pin 50 of the first arm 38 is present at the front end of the third cam groove 60 of the guide plate 36.

The fourth cam pin 43 of the second arm 40 is present at the front end of the fourth cam groove 64 of the guide plate 36.

The operation of the right drive mechanism 28 will now be described.

In the left projected position of the front panel 16, the first and second arms 38 and 40 of the right drive mechanism 28 are in the normal position. As shown in FIG. 17, the first cam pin 46 of the first arm 38 is present at one end of the fourth cam portion 5208 of the first cam groove 52 of the cam plate 34 and present also at the junction between the first guide portion 5602 and the second guide portion 5604 of the third cam groove 56 of the guide plate 36.

The second cam pin 48 of the first arm 38 is present at one end of the eighth cam portion 5408 of the second cam groove 54 of the cam plate 34 and present also at the junction between the third guide portion 5802 and the fourth guide portion 5804 of the fourth cam groove 58 of the guide plate 36.

The third cam pin 50 of the first arm 38 is present at the rear end of the third cam groove 60 of the guide plate 36.

The fourth cam pin 43 of the second arm 40 is present at the rear end of the fourth cam groove 64 of the guide plate 36.

Thus, the first and second arms 38 and 40 of the left drive mechanism 26 are in the projected position, and the first and second arms 38 and 40 of the right drive mechanism 28 are in the normal position as shown in FIG. 2. Accordingly, the front panel 16 is in the left projected position where the left side portion of the front panel 16 is projected frontward in comparison with the right side portion of the front panel 16. In this position, the user sitting in the driver seat can easily operate the operation members 14 and can also easily see the display portion 1012.

(Normal Position)

The operation of the left drive mechanism 26 will now be described.

Figure 11:
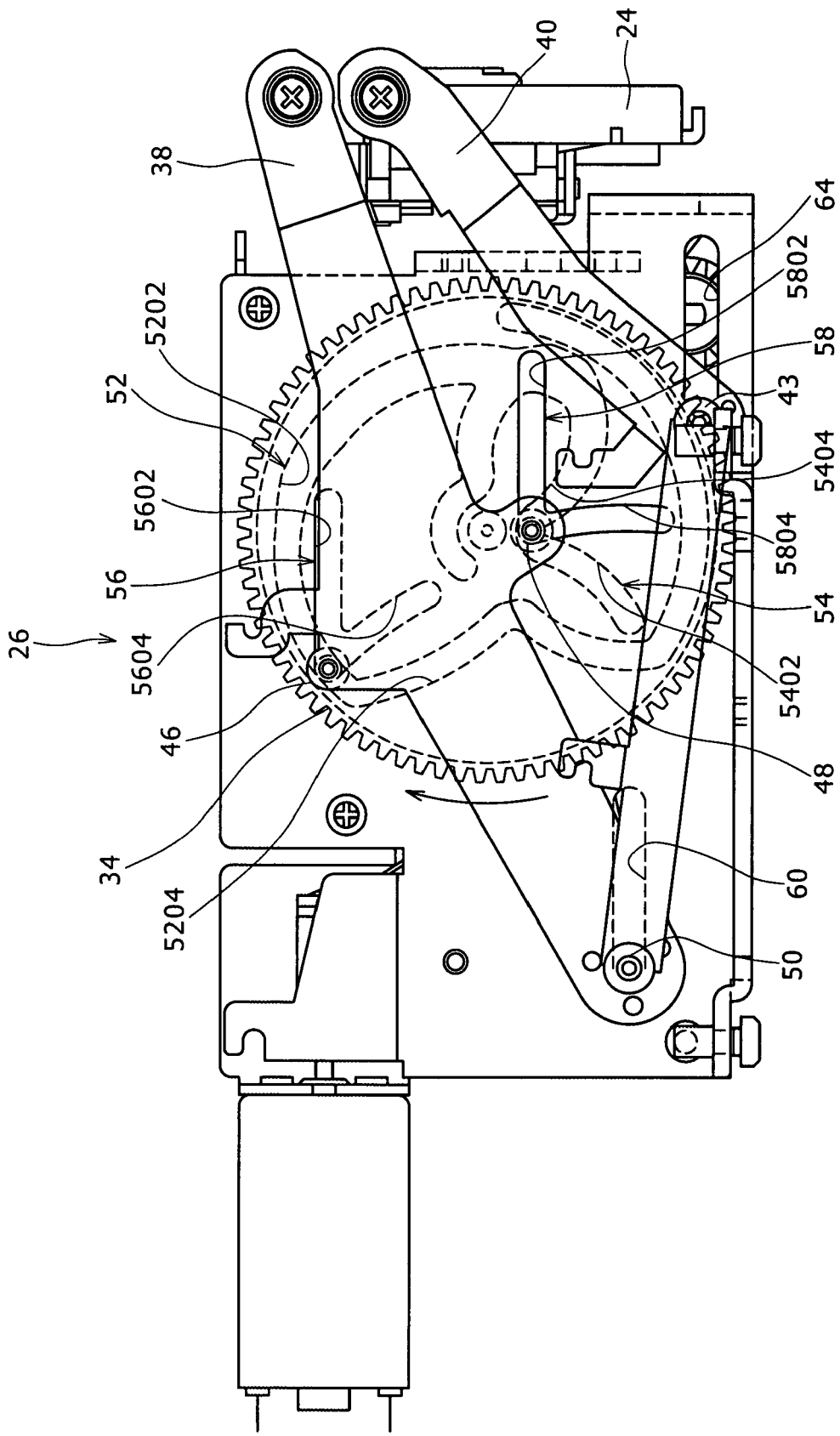

When the motor 30 is operated in the forward direction from the left projected position of the front panel 16, the cam plate 34 is rotated in the forward direction and the first cam pin 46 is therefore guided by the first cam portion 5202 and the first guide portion 5602. At the same time, the second cam pin 48 is guided by the fifth cam portion 5402 and the third guide portion 5802. As a result, the first arm 38 is moved rearward, and the second arm 40 is also moved rearward with its intermediate portion being bent in concert with the motion of the first arm 38. Thus, the first and second arms 38 and 40 are changed from the projected position to the normal position as shown in FIGS. 1, 11, and 12.

In the normal position shown in FIG. 12, the first cam pin 46 is present at the junction between the first cam portion 5202 and the second cam portion 5204 of the first cam groove 52, and present also at the junction between the first guide portion 5602 and the second guide portion 5604 of the third cam groove 56.

The second cam pin 48 is present at the junction between the fifth cam portion 5402 and the sixth cam portion 5404 of the second cam groove 54, and present also at the junction between the third guide portion 5802 and the fourth guide portion 5804 of the fourth cam groove 58.

The third cam pin 50 is present at the rear end of the third cam groove 60.

The fourth cam pin 43 is present at the rear end of the fourth cam groove 64.

The operation of the right drive mechanism 28 will now be described.

When the motor 30 is operated in the forward direction from the left projected position of the front panel 16, the cam plate 34 is rotated in the forward direction and the first cam pin 46 relatively moves in the fourth cam portion 5208. At the same time, the second cam pin 48 relatively moves in the eighth cam portion 5408. Accordingly, the first and second arms 38 and 40 stay in the normal position.

Accordingly, as shown in FIG. 18, the first cam pin 46 is present at the junction between the fourth cam portion 5208 and the third cam portion 5206 of the first cam groove 52, and present also at the junction between the first guide portion 5602 and the second guide portion 5604 of the third cam groove 56.

The second cam pin 48 is present at the junction between the eighth cam portion 5408 and the seventh cam portion 5406 of the second cam groove 54, and present also at the junction between the third guide portion 5802 and the fourth guide portion 5804 of the fourth cam groove 58.

The third cam pin 50 of the first arm 38 stays at the rear end of the third cam groove 60, and the fourth cam pin 43 of the second arm 40 stays at the rear end of the fourth cam groove 64.

Thus, the first and second arms 38 and 40 of the left drive mechanism 26 and the first and second arms 38 and 40 of the right drive mechanism 28 become the normal position as shown in FIG. 1. Accordingly, the front panel 16 becomes the normal position where the front panel 16 is parallel to the front surface of the apparatus body 12, and the loading slot 22 is closed by the rear surface of the front panel 16.

(Open Position)

The operation of the left drive mechanism 26 will now be described.

Figure 4:
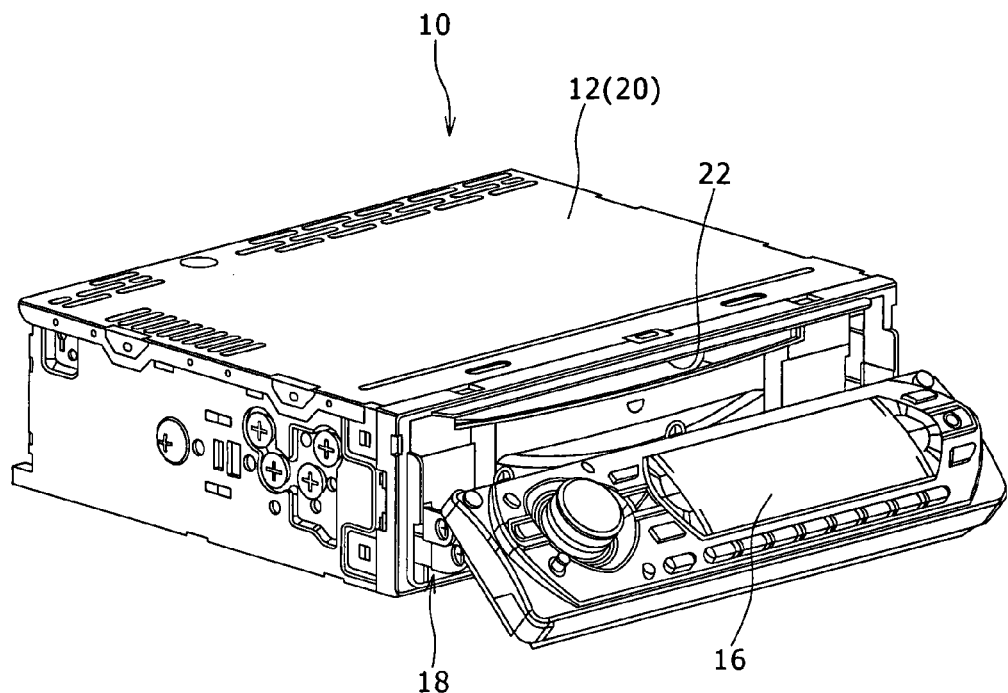
FIG. 4 is a perspective view of the in-vehicle apparatus in the condition that the front panel is in an open position.
Figure 13:
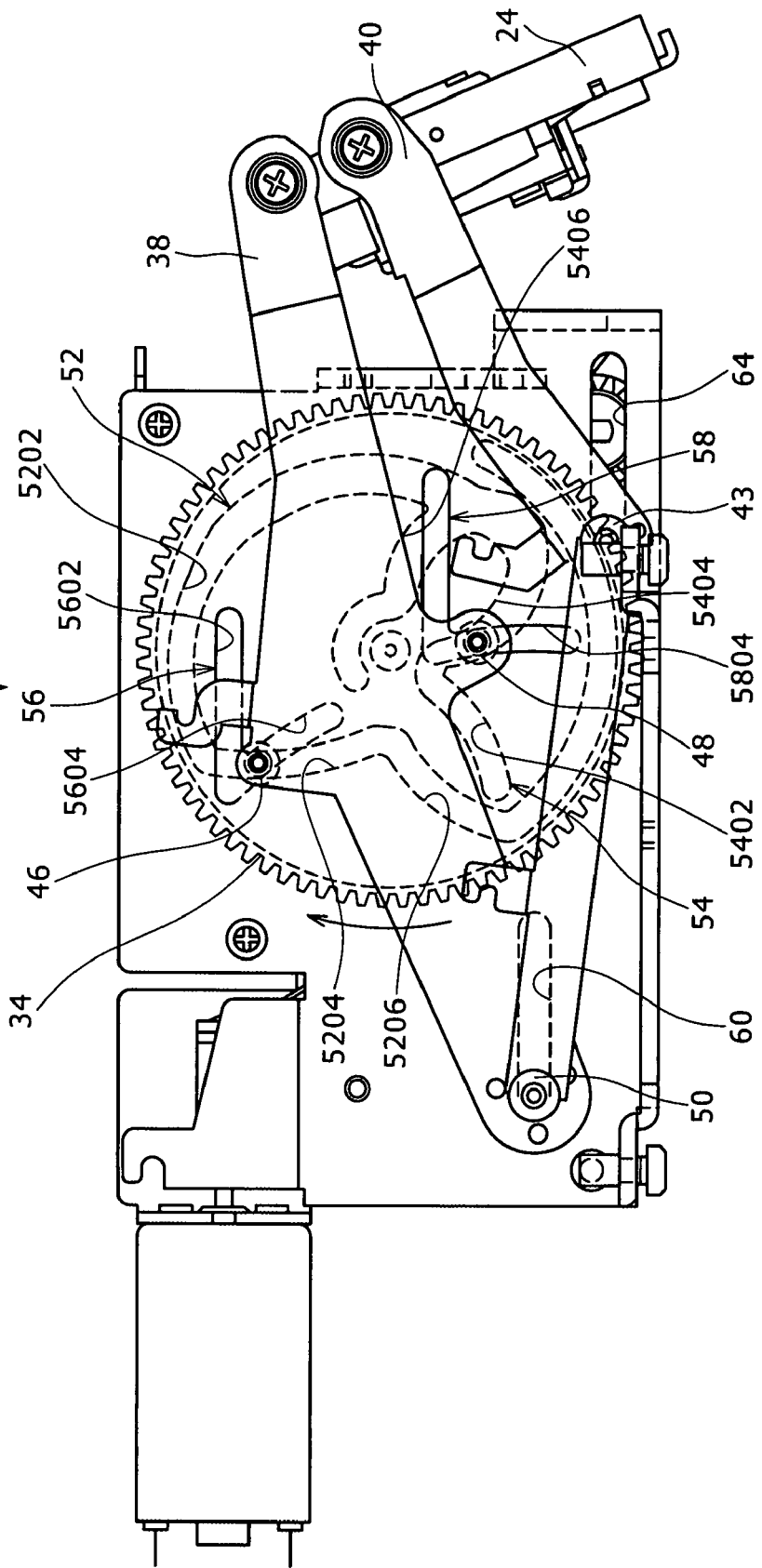

When the motor 30 is operated in the forward direction from the normal position of the front panel 16, the cam plate 34 is rotated in the forward direction and the first cam pin 46 is guided by the second cam portion 5204 and the second guide portion 5604. At the same time, the second cam pin 48 is guided by the sixth cam portion 5404 and the fourth guide portion 5804. Accordingly, the first arm 38 is pivotally moved about the third cam pin 50 as a fulcrum so that the front end of the first arm 38 is lowered. At the same time, the second arm 40 is moved frontward so as to be expanded. As a result, the first and second arms 38 and 40 become the open position as shown in FIGS. 4, 13, and 14.

Figure 14:
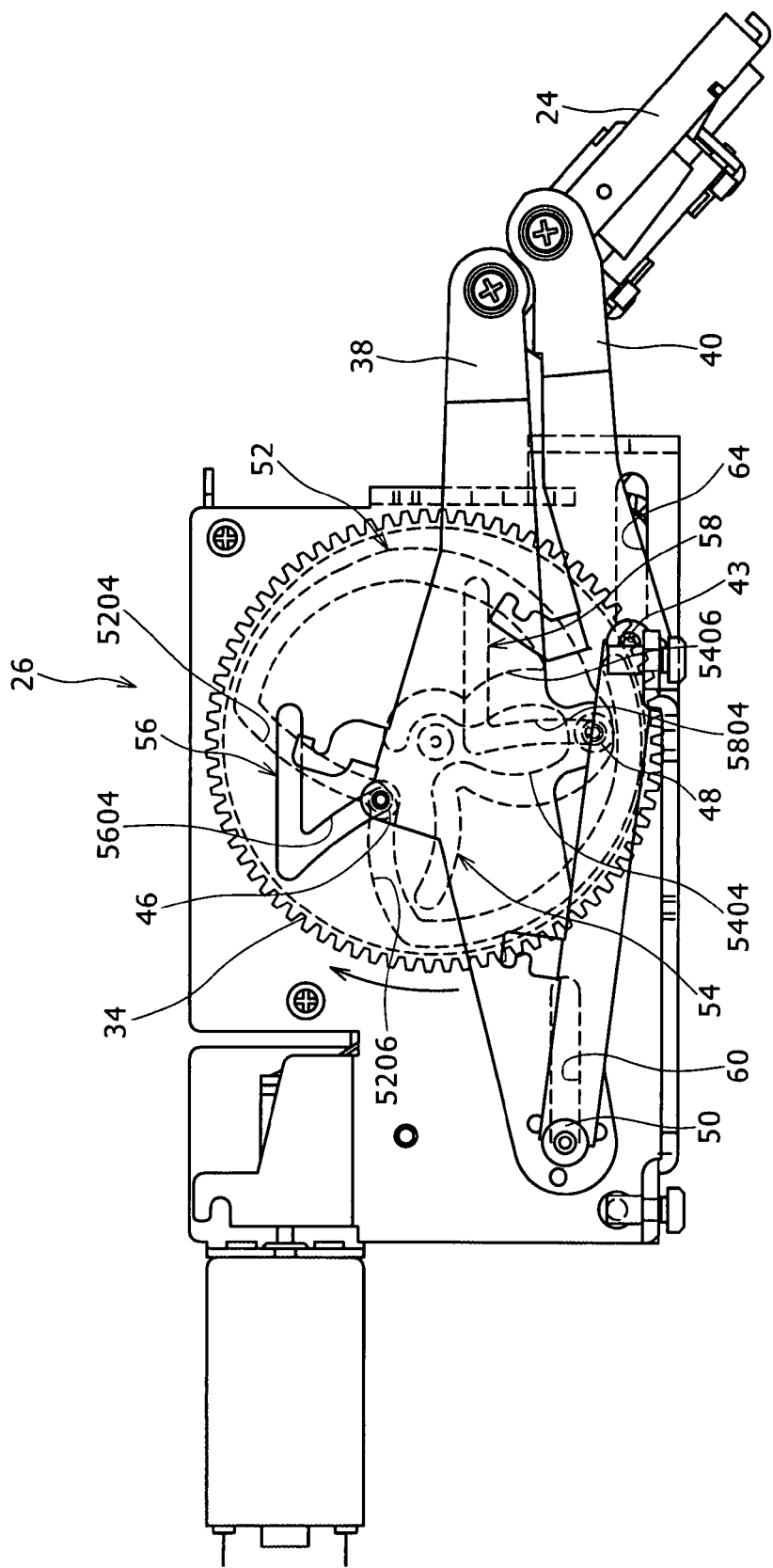

In the open position shown in FIG. 14, the first cam pin 46 is present at the junction between the second cam portion 5204 and the third cam portion 5206 of the first cam groove 52, and present also at the front end (lower end) of the second guide portion 5604 of the third cam groove 56.

The second cam pin 48 is present at the junction between the sixth cam portion 5404 and the seventh cam portion 5406 of the second cam groove 54, and present also at the front end (lower end) of the fourth guide portion 5804 of the fourth cam groove 58.

The third cam pin 50 is present at the rear end of the third cam groove 60.

The fourth cam pin 43 is present at the rear end of the fourth cam groove 64.

The operation of the right drive mechanism 28 will now be described.

When the motor 30 is operated in the forward direction from the normal position of the front panel 16, the cam plate 34 is rotated in the forward direction and the first cam pin 46 is guided by the third cam portion 5206 and the second guide portion 5604. At the same time, the second cam pin 48 is guided by the seventh cam portion 5406 and the fourth guide portion 5804. Accordingly, the first arm 38 is pivotally moved about the third cam pin 50 as a fulcrum so that the front end of the first arm 38 is lowered. At the same time, the second arm 40 is moved frontward so as to be expanded. As a result, the first and second arms 38 and 40 become the open position as shown in FIGS. 4 and 19.

Figure 19:
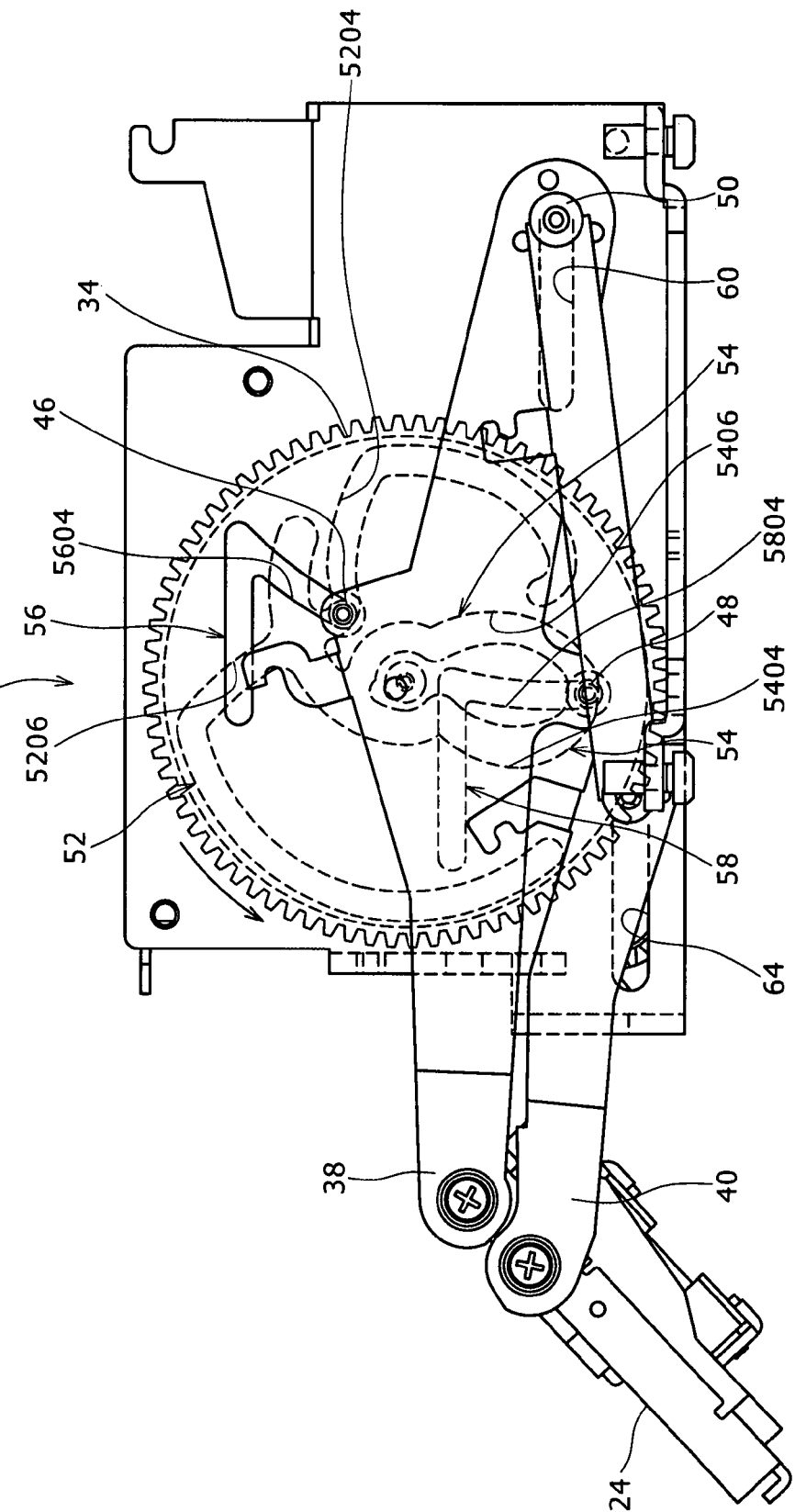

In the open position shown in FIG. 19, the first cam pin 46 is present at the junction between the third cam portion 5206 and the second cam portion 5204 of the first cam groove 52, and present also at the front end (lower end) of the second guide portion 5604 of the third cam groove 56.

The second cam pin 48 is present at the junction between the seventh cam portion 5406 and the sixth cam portion 5404 of the second cam groove 54, and present also at the front end (lower end) of the fourth guide portion 5804 of the fourth cam groove 58.

The third cam pin 50 of the first arm 38 is present at the rear end of the third cam groove 60 of the guide plate 36.

The fourth cam pin 43 of the second arm 40 is present at the rear end of the fourth cam groove 64 of the guide plate 36.

Thus, as shown in FIG. 4, the front panel 16 becomes the open position where it is present at a lower position in front of the apparatus body 12 in such a manner that the front surface of the front panel 16 is oriented obliquely upward to open the loading slot 22. In this open position, the disk-shaped recording medium can be loaded and unloaded through the loading slot 22.

(Normal Position)

The operation of the left drive mechanism 26 will now be described.

When the motor 30 is operated in the forward direction from the open position of the front panel 16, the cam plate 34 is rotated in the forward direction and the first cam pin 46 is guided by the third cam portion 5206 and the second guide portion 5604. At the same time, the second cam pin 48 is guided by the seventh cam portion 5406 and the fourth guide portion 5804. Accordingly, the first arm 38 is pivotally moved about the third cam pin 50 as a fulcrum so that the front end of the first arm 38 is raised. At the same time, the second arm 40 is moved rearward so as to be bent. As a result, the first and second arms 38 and 40 become the normal position as shown in FIGS. 1 and 15.

Figure 15:
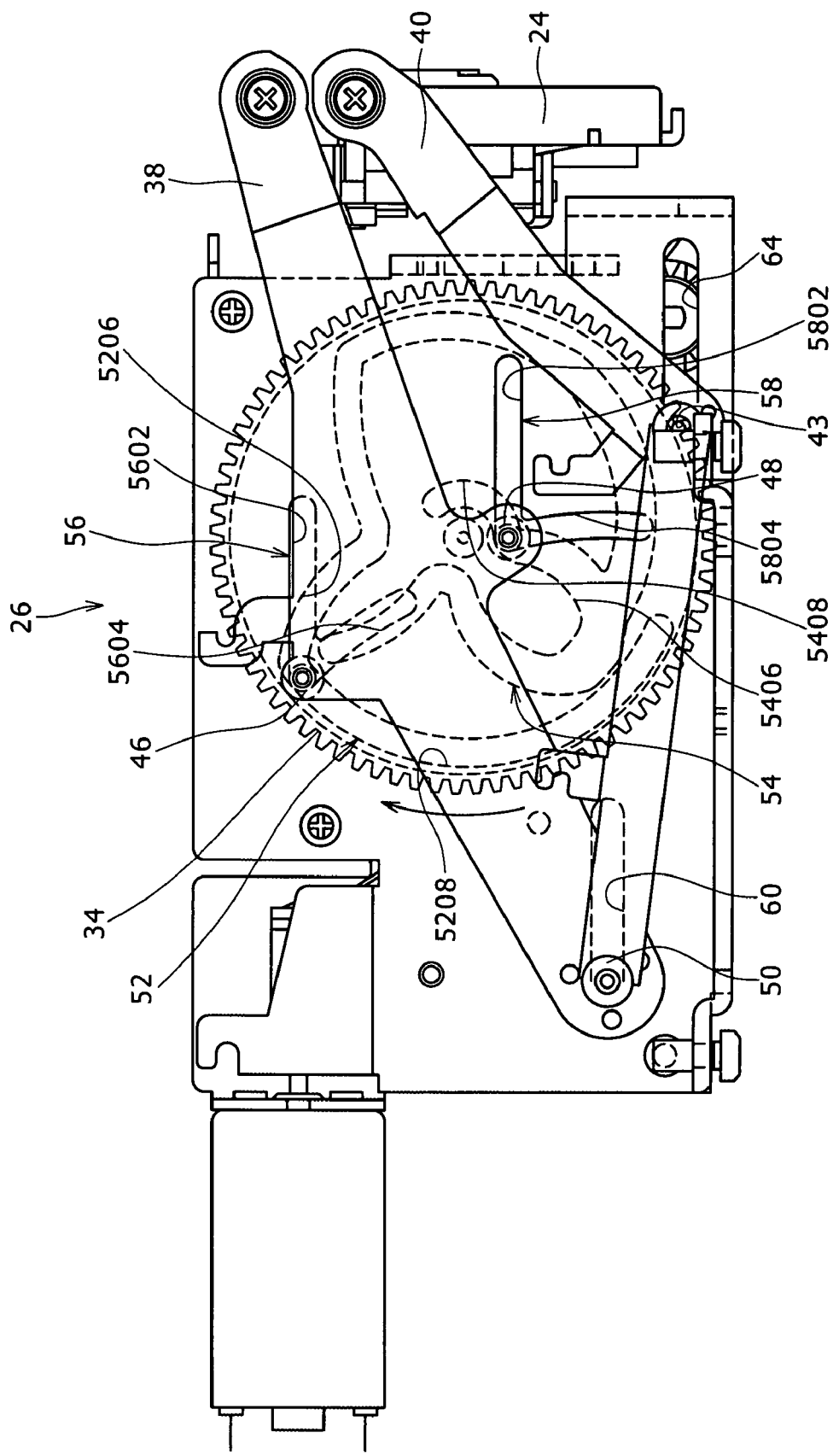
Figure 16:
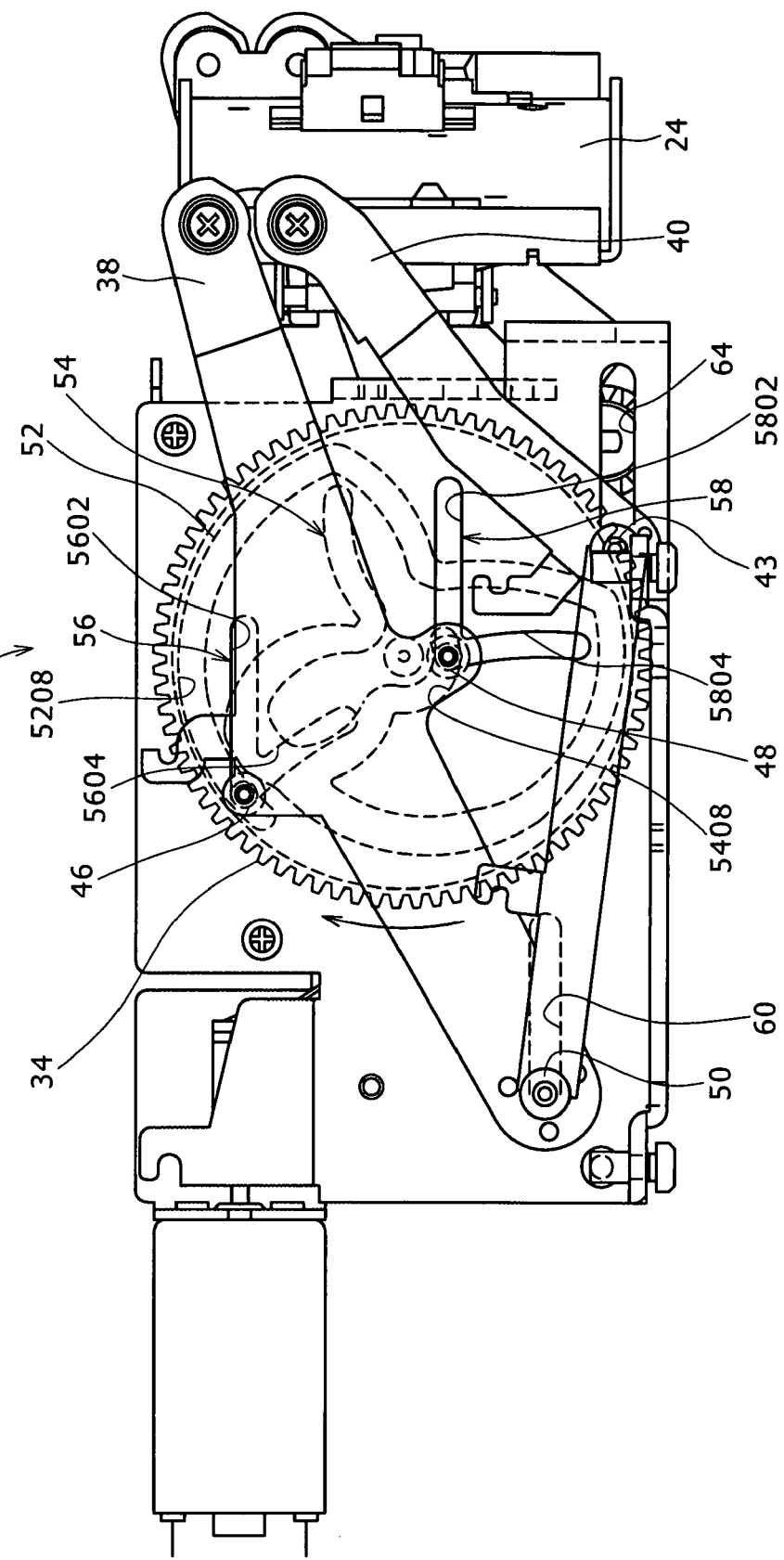

In the normal position shown in FIG. 15, the first cam pin 46 is present at the junction between the third cam portion 5206 and the fourth cam portion 5208 of the first cam groove 52, and present also at the junction between the first guide portion 5602 and the second guide portion 5604 of the third cam groove 56.

The second cam pin 48 is present at the junction between the seventh cam portion 5406 and the eighth cam portion 5408 of the second cam groove 54, and present also at the junction between the third guide portion 5802 and the fourth guide portion 5804 of the fourth cam groove 58.

The third cam pin 50 is present at the rear end of the third cam groove 60.

The fourth cam pin 43 is present at the rear end of the fourth cam groove 64.

The operation of the right drive mechanism 28 will now be described.

When the motor 30 is operated in the forward direction from the open position of the front panel 16, the cam plate 34 is rotated in the forward direction and the first cam pin 46 is guided by the second cam portion 5204 and the second guide portion 5604. At the same time, the second cam pin 48 is guided by the sixth cam portion 5404 and the fourth guide portion 5804. Accordingly, the first arm 38 is pivotally moved about the third cam pin 50 as a fulcrum so that the front end of the first arm 38 is raised. At the same time, the second arm 40 is moved rearward so as to be bent. As a result, the first and second arms 38 and 40 become the normal position as shown in FIGS. 1 and 20.

Figure 20:
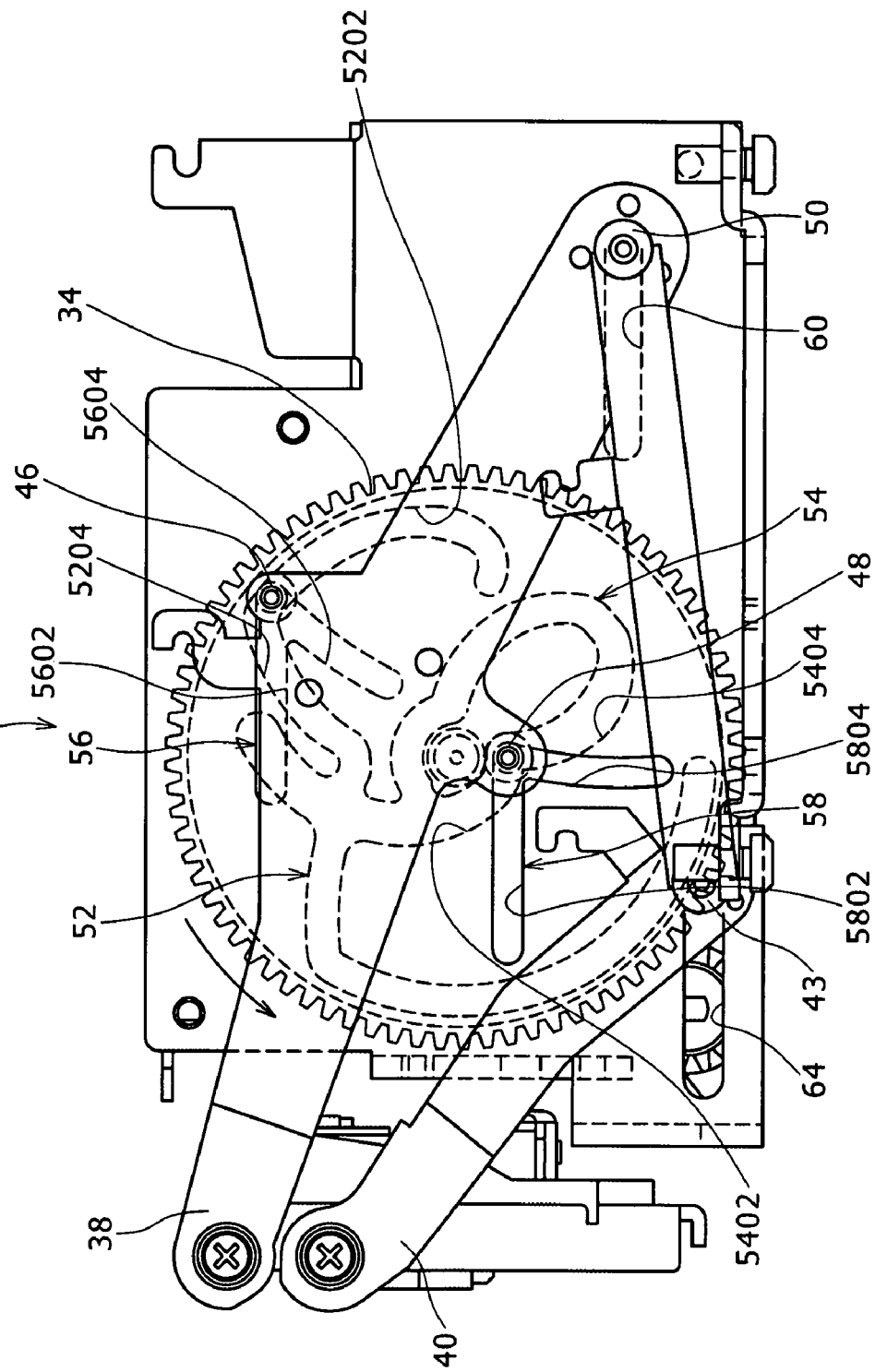

In the normal position shown in FIG. 20, the first cam pin 46 is present at the junction between the second cam portion 5204 and the first cam portion 5202 of the first cam groove 52, and present also at the junction between the first guide portion 5602 and the second guide portion 5604 of the third cam groove 56.

The second cam pin 48 is present at the junction between the sixth cam portion 5404 and the fifth cam portion 5402 of the second cam groove 54, and present also at the junction between the third guide portion 5802 and the fourth guide portion 5804 of the fourth cam groove 58.

The third cam pin 50 of the first arm 38 is present at the rear end of the third cam groove 60.

The fourth cam pin 43 of the second arm 40 is present at the rear end of the fourth cam groove 64.

Thus, as shown in FIG. 1, the front panel 16 becomes the normal position where it is parallel to the front surface of the apparatus body 12 and the loading slot 22 is closed by the rear surface of the front panel 16.

(Right Projected Position)

The operation of the left drive mechanism 26 will now be described.

When the motor 30 is operated in the forward direction from the normal position of the front panel 16, the cam plate 34 is rotated in the forward direction and the first cam pin 46 relatively moves in the fourth cam portion 5208. At the same time, the second cam pin 48 relatively moves in the eighth cam portion 5408. Accordingly, the first and second arms 38 and 40 of the left drive mechanism 26 stay in the normal position.

In the right projected position of the front panel 16, the first and second arms 38 and 40 of the left drive mechanism 26 are in the normal position. In this normal position shown in FIG. 16, the first cam pin 46 is present at one end of the fourth cam portion 5208 of the first cam groove 52, and present also at the junction between the first guide portion 5602 and the second guide portion 5604 of the third cam groove 56.

The second cam pin 48 is present at one end of the eighth cam portion 5408 of the second cam groove 54, and present also at the junction between the third guide portion 5802 and the fourth guide portion 5804 of the fourth cam groove 56.

The third cam pin 50 is present at the rear end of the third cam groove 60.

The fourth cam pin 43 is present at the rear end of the fourth cam groove 64.

The operation of the right drive mechanism 28 will now be described.

Figure 21:
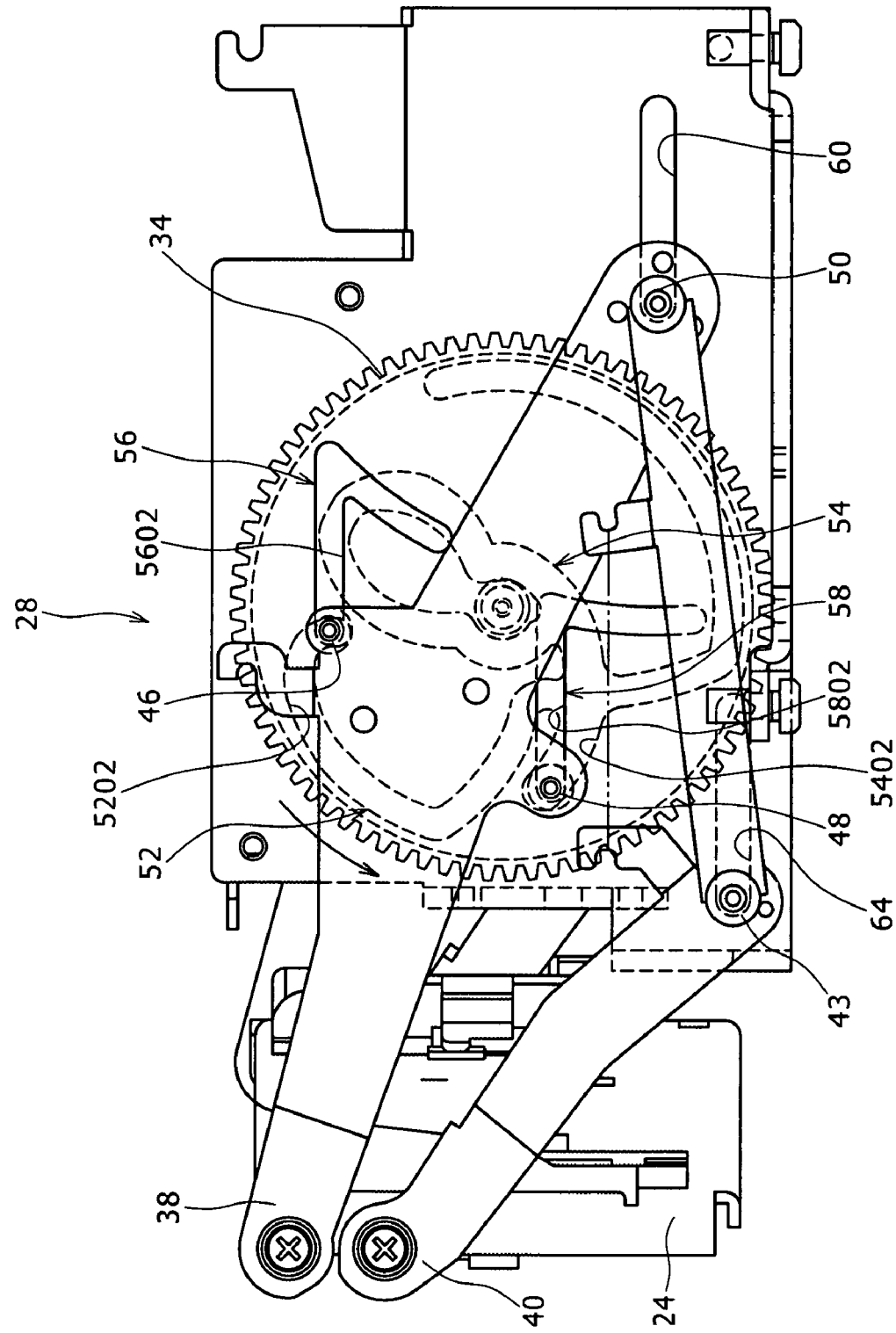

When the motor 30 is operated in the forward direction from the normal position of the front panel 16, the cam plate 34 is rotated in the forward direction and the first cam pin 46 is guided by the first cam portion 5202 and the first guide portion 5602. At the same time, the second cam pin 48 is guided by the fifth cam portion 5402 and the third guide portion 5802. Accordingly, the first arm 38 is moved frontward, and the second arm 40 is also moved frontward in concert with the first arm 38. As a result, the first and second arms 38 and 40 become the projected position as shown in FIGS. 3 and 21.

In the right projected position of the front panel 16, the first and second arms 38 and 40 of the right drive mechanism 28 are in the projected position. In this projected position shown in FIG. 21, the first cam pin 46 is present at one end of the first cam portion 5202 of the first cam groove 52, and present also at the front end of the first guide portion 5602 of the third cam groove 56.

The second cam pin 48 is present at one end of the fifth cam portion 5402 of the second cam groove 54, and present also at the front end of the third guide portion 5802 of the fourth cam groove 58.

The third cam pin 50 of the first arm 38 is present at the front end of the third cam groove 60.

The fourth cam pin 43 of the second arm 40 is present at the front end of the fourth cam groove 64.

Thus, as shown in FIG. 3, the front panel 16 becomes the right projected position where the right side portion of the front panel 16 is projected frontward in comparison with the left side portion of the front panel 16. In this position, the user sitting in the passenger seat can easily operate the operation members 14 and can also easily see the display portion 1012.

When the motor 30 is operated in the reverse direction from the right projected position of the front panel 16, the front panel 16 is moved from the right projected position through the normal position, the open position, and the normal position to the left projected position in the reverse operation.

In moving the front panel 16 to any one of the left projected position, the normal position, the open position, and the right projected position, the control portion 1014 operates the motor 30 in the forward or reverse direction according to the operation of the open/close button 14A, the leftward inclination button 14B, or the rightward inclination button 14C.

More specifically, when the open/close button 14A is pushed in the condition where the front panel 16 is in any position other than the open position (i.e., in any one of the left projected position, the normal position, and the right projected position), the control portion 1014 operates the motor 30 in the forward or reverse direction to move the front panel 16 to the open position. Further, when the open/close button 14A is pushed in the condition where the front panel 16 is in the open position, the control portion 1014 operates the motor 30 in the forward or reverse direction to move the front panel 16 to the normal position.

When the leftward inclination button 14B is pushed in the condition where the front panel 16 is in any position other than the right projected position (i.e., in any one of the left projected position, the normal position, and the open position), the control portion 1014 operates the motor 30 in the forward direction to move the front panel 16 to the right projected position.

When the rightward inclination button 14C is pushed in the condition where the front panel 16 is in any position other than the left projected position (i.e., in any one of the right projected position, the normal position, and the open position), the control portion 1014 operates the motor 30 in the reverse direction to move the front panel 16 to the left projected position.

There will now be described the operation and effect of the cam mechanism composed of the first cam groove 52, the second cam groove 54, the first to fourth cam pins 46, 48, 50, and 43, and the third to sixth cam grooves 56, 58, 60, and 64.

It is known that when the angle θ formed between the direction of movement of the first cam pin 46 or the second cam pin 48 and the direction of pressing of the wall of the first cam groove 52 or the second cam groove 54 against the first cam pin 46 or the second cam pin 48 is 90° the force can be transmitted most efficiently. It is also known that when the angle θ is too small, the force is hard to transmit and that when the angle θ varies largely, the smoothness of the motion is hindered.

In this preferred embodiment, the front panel 16 is moved from the left projected position through the normal position, the open position, and the normal position to the right projected position in the range of 360° rotation of the cam plate 34 having a small diameter. Accordingly, the angle θ must be set smaller than 90°.

In this preferred embodiment, the shapes of the first and second cam grooves 52 and 54 are optimized so that the angle θ becomes within the range of 40° to 45° over the range of the first and second cam grooves 52 and 54, thereby efficiently transmitting the longitudinal moving forces (frontward and rearward forces) to the first and second cam pins 46 and 48.

In the cam mechanism according to this preferred embodiment, the first cam groove 52 mainly imparts the frontward and rearward forces to the first arm 38.

Accordingly, when the motor 30 is operated in the forward direction in the condition where the first cam pin 46 is present at the junction between the first cam portion 5202 and the second cam portion 5204 in the left drive mechanism 26 as shown in FIG. 12, the wall surface 5204A of the second cam portion 5204 extending substantially in the vertical direction comes into abutment against the first cam pin 46 to impart a large frontward moving force to the first cam pin 46. As a result, there is a possibility that the first cam pin 46 may abuts against the wall portion 56A formed at the junction between the first guide portion 5602 and the second guide portion 5604, causing the stop of the rotation of the cam plate 34 in the left drive mechanism 26.

Similarly, when the motor 30 is operated in the forward direction in the condition where the first cam pin 46 is present at the junction between the first cam portion 5202 and the second cam portion 5204 in the right drive mechanism 28 as shown in FIG. 18, the wall surface 5206A of the third cam portion 5206 extending substantially in the vertical direction comes into abutment against the first cam pin 46 to impart a large frontward moving force to the first cam pin 46. As a result, there is a possibility that the first cam pin 46 may abuts against the wall portion 56A formed at the junction between the first guide portion 5602 and the second guide portion 5604, causing the stop of the rotation of the cam plate 34 in the right drive mechanism 28.

The cam mechanism according to this preferred embodiment has the first cam pin guiding portion 70 in each of the left and right drive mechanisms 26 and 28 to cope with the above possibility. That is, the second cam pin 48 is moved by the first cam pin guiding portion 70 to thereby move the first arm 38, thereby guiding the first cam pin 46 into the second guide portion 5604 as a target groove to be engaged with the first cam pin 46 by the forward rotation of the cam plate 34.

In the cam mechanism according to this preferred embodiment, the first cam groove 52 mainly imparts the frontward and rearward forces to the first arm 38. On the other hand, the second cam groove 54 and the fourth cam groove 58 mainly guide the first cam pin 46 into the first guide portion 5602 or the second guide portion 5604 at the junction between the first cam portion 5202 and the second cam portion 5204.

Accordingly, unlike an existing cam mechanism, it is not necessary to provide any dedicated member for guiding the first cam pin 46 into the second guide portion 5604, and it is also not necessary to provide a plurality of cam pins different in diameter and length and a plurality of cam grooves different in width and depth as corresponding to the different diameters and lengths of the above cam pins. Thus, the first arm 38 can be smoothly moved to displace the front panel 16 in the frontward and rearward directions.

Accordingly, the number of parts can be reduced and the structure of the cam mechanism can be simplified owing to the removal of the dedicated member and the plural cam pins having different sizes as mentioned above, thereby allowing a reduction in size and cost of the drive mechanism 18 and the in-vehicle apparatus 10.

The operation and effect of this preferred embodiment will now be described.

The front panel 16 is movable to the left projected position, the right projected position, the open position, and the normal position by the drive mechanism 18.

In the left projected position where the left side portion of the front panel 16 is projected frontward in comparison with the right side portion of the front panel 16, the user sitting in the driver seat can easily operate the operation members 14 and can easily see the display portion 1012.

In the right projected position where the right side portion of the front panel 16 is projected frontward in comparison with the left side portion of the front panel 16, the user sitting in the passenger seat can easily operate the operation members 14 and can easily see the display portion 1012.

In the open position where the front panel 16 is inclined frontward so as to open the loading slot 22, the disk-shaped recording medium can be loaded and unloaded through the loading slot 22.

In the normal position, the front panel 16 is arranged in parallel to the front surface of the apparatus body 12 in proximity thereto. Accordingly, the front panel 16 does not become an interference and can improve the appearance in the compartment including the in-vehicle apparatus 10.

In the case that the user is sitting in the driver seat, it is considered that the front panel 16 is moved most frequently among the left projected position, the normal position, and the open position.

In the case that the user is sitting in the passenger seat, it is considered that the front panel 16 is moved most frequently among the right projected position, the normal position, and the open position.

According to this preferred embodiment, the normal position is interposed between the left projected position and the open position during the movement of the front panel 16, and also interposed between the right projected position and the open position during the movement of the front panel 16. Accordingly, in the case that the user is sitting in the driver seat, the front panel 16 can be moved quickly and efficiently among the left projected position, the normal position, and the open position. In the case that the user is sitting in the passenger seat, the front panel 16 can be moved quickly and efficiently among the right projected position, the normal position, and the open position. Thus, the in-vehicle apparatus 10 is easy to use, and the practical value of the in-vehicle apparatus 10 can be greatly improved.

As mentioned above, the normal position is interposed between the left projected position and the open position during the movement of the front panel 16 and also interposed between the right projected position and the open position during the movement of the front panel 16. In other words, the front panel 16 can be moved from the normal position to the left projected position or from the normal position to the open position. Further, the front panel 16 can be moved from the normal position to the right projected position or from the normal position to the open position. Thus, the front panel 16 can be moved from the normal position as a reference position. Accordingly, the motion of the front panel 16 can be simplified, and in the case where the drive mechanism 18 is constructed by using cam grooves and cam pins as in this preferred embodiment, the structure of the drive mechanism 18 can be simplified.

Since the structure of the drive mechanism 18 can be simplified, the structures of the left and right drive mechanisms 26 and 28 constituting the drive mechanism 18 can be simplified, and the left and right drive mechanisms 26 and 28 can be reliably driven by the single motor 30, thereby allowing a reduction in cost and size of the drive mechanism 18.

The motion of the first arm 38 is determined by two different points. Accordingly, in the case that the first cam pin 46 is engaged with the first cam groove 52 and the third cam groove 56 and that the second cam pin 48 is engaged with the second cam groove 54 and the fourth cam groove 58 to thereby determine the motion of the first arm 38 by the rotation of the cam plate 34, the third cam pin 50 and the fifth cam groove 60 may be omitted.

In the case that the first cam pin 46 is engaged with the first cam groove 52 and the third cam groove 56 and that the third cam pin 50 is engaged with the fifth cam groove 60 to thereby determine the motion of the first arm 38 by the rotation of the cam plate 34, the second cam groove 54 and the fourth cam groove 58 engaged with the second cam pin 48 may be formed by only the first cam pin guiding portion 70, and the other portion may be formed merely as an escape groove.

While the in-vehicle apparatus 10 is applied to a car audio system in this preferred embodiment, the in-vehicle apparatus 10 is widely applicable to any other in-vehicle apparatus such as a car navigation system.

The cam pin used in the present invention includes not only the body of a cam pin, but also a roller or the like mounted on the body of the cam pin.

The present invention features that the front panel 16 is movable to the normal position, the left projected position, the right projected position, and the open position by the drive mechanism 18 and that the normal position is interposed between the left projected position and the open position during the movement of the front panel 16 and also interposed between the right projected position and the open position during the movement of the front panel 16. The configuration of the drive mechanism 18, i.e., the left and right drive mechanisms 26 and 28 is not a point of this invention. For example, the left and right drive mechanisms 26 and 28 may include individual motors, pinions adapted to be rotated by these motors, and racks meshing with these pinions to thereby move the front panel 16. Further, the drive mechanism 18 may have any existing configuration for converting a rotational motion of the motor into a linear motion. Further, the motor as an actuator may be replaced by a direct-acting actuator such as a solenoid and a linear motor. However, the configuration of this preferred embodiment is advantageous in simplification of the structure and size reduction.

In this preferred embodiment, the motor is operated in the forward direction to sequentially move the front panel from the left projected position through the normal motion, the open position, and the normal position to the right projected position in this order. When the front panel reaches the right projected position, the forward operation of the motor is stopped. Thereafter, the motor is operated in the reverse direction to sequentially move the front panel from the right projected position through the normal position, the open position, and the normal position to the left projected position in this order. When the front panel reaches the left projected position, the reverse operation of the motor is stopped. As a modification, the cam groove may be changed in the following manner. The motor is operated in the forward direction to sequentially move the front panel from the left projected position through the normal position, the open position, and the normal position to the right projected position in this order. Thereafter, the motor is further operated in the forward direction to restore the left projected position and to repeat the same course of movement of the front panel.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An in-vehicle apparatus comprising:
   an apparatus body installed in a compartment and having a reproducing portion for reproducing data recorded on a recording medium;
   a loading slot formed on the front surface of said apparatus body for loading and unloading said recording medium;
   a front panel arranged in front of said apparatus body and having operation members for operating said apparatus body; and
   a drive mechanism for operatively connecting said front panel to said apparatus body so as to move said front panel;
   said front panel being movable by said drive mechanism to a normal position where said front panel is oriented in parallel to the front surface of said apparatus body, a left projected position where a left side portion of said front panel is projected frontward in comparison with a right side portion of said front panel, a right projected position where the right side portion of said front panel is projected frontward in comparison with the left side portion of said front panel, and an open position where said front panel is inclined frontward so as to open said loading slot;
   said normal position being interposed between said left projected position and said open position during the movement of said front panel and also interposed between said right projected position and said open position during the movement of said front panel.

2. The in-vehicle apparatus according to claim 1, wherein said drive mechanism comprises:
   a left drive mechanism provided at a left side portion of said apparatus body and connected to the left side portion of said front panel; and
   a right drive mechanism provided at a right side portion of said apparatus body and connected to the right side portion of said front panel.

3. The in-vehicle apparatus according to claim 2, wherein said left drive mechanism comprises
   a left cam plate provided at the left side portion of said apparatus body and having a cam groove,
   a left guide plate provided on the left side of said left cam plate and having a cam groove, a first arm extending in the longitudinal direction of said apparatus body on the left side of said left guide plate, said first arm having a front end connected to the left side portion of said front panel, a rear end engaged with said cam groove of said left guide plate, and a longitudinally intermediate portion engaged with said cam groove of said left cam plate and said cam groove of said left guide plate, whereby said first arm is moved in the longitudinal direction by the rotation of said left cam plate, and a second arm composed of a front half and a rear half connected with each other and extending in the longitudinal direction in the vicinity of said first arm, said front half having a front end connected to the left side portion of said front panel at a position different from the position of connection of said front end of said first arm and a rear end connected to said rear half, said rear half having a front end connected to said front half and a rear end connected to said rear end of said first arm, said second arm being bendable at the connection between said front half and said rear half, which connection is engaged with said cam groove of said left guide plate, whereby said second arm is moved in the longitudinal direction so as to be expanded and bent by the rotation of said left cam plate; and said right drive mechanism includes a right cam plate provided at the right side portion of said apparatus body and having a cam groove;

a right guide plate provided on the right side of said right cam plate and having a cam groove, a third arm extending in the longitudinal direction of said apparatus body on the right side of said right guide plate, said third arm having a front end connected to the right side portion of said front panel, a rear end engaged with said cam groove of said right guide plate, and a longitudinally intermediate portion engaged with said cam groove of said right cam plate and said cam groove of said right guide plate, whereby said third arm is moved in the longitudinal direction by the rotation of said right cam plate, and a fourth arm composed of a front half and a rear half connected with each other and extending in the longitudinal direction in the vicinity of said third arm, said front half of said fourth arm having a front end connected to the right side portion of said front panel at a position different from the position of connection of said front end of said third arm and a rear end connected to said rear half of said fourth arm, said rear half of said fourth arm having a front end connected to said front half of said fourth arm and a rear end connected to said rear end of said third arm, said fourth arm being bendable at the connection between said front half and said rear half of said fourth arm, which connection is engaged with said cam groove of said right guide plate, whereby said fourth arm is moved in the longitudinal direction so as to be expanded and bent by the rotation of said right cam plate.

4. The in-vehicle apparatus according to claim 3, wherein at least one of said left drive mechanism and said right drive mechanism has a motor for rotating said left cam plate and said right cam plate.

5. The in-vehicle apparatus according to claim 3, wherein any one of said left drive mechanism and said right drive mechanism has a motor for rotating said left cam plate and said right cam plate.

6. The in-vehicle apparatus according to claim 1, wherein said front panel has a display portion for displaying information on the operation of said apparatus body.

7. The in-vehicle apparatus according to claim 1, wherein said front panel has a laterally elongated rectangular shape such that the lateral size is larger than the vertical size.

8. The in-vehicle apparatus according to claim 1, further comprising a holder for detachably holding said front panel, said holder being connected through said drive mechanism to said apparatus body.

9. An in-vehicle apparatus comprising:

an apparatus body installed in a compartment and having a reproducing portion for reproducing data recorded on a recording medium;

a loading slot formed on the front surface of said apparatus body for loading and unloading said recording medium;

a front panel arranged in front of said apparatus body and having operation members for operating said apparatus body; and a drive mechanism for operatively connecting said front panel to said apparatus body so as to move said front panel;

said front panel being movable by said drive mechanism to a normal position where said front panel is oriented in parallel to the front surface of said apparatus body, a left projected position where a left side portion of said front panel is projected frontward in comparison with a right side portion of said front panel, a right projected position where the right side portion of said front panel is projected frontward in comparison with the left side portion of said front panel, and an open position where said front panel is inclined frontward so as to open said loading slot;

said drive mechanism having a motor for moving said front panel;

wherein when said motor is operated in one rotational direction, said front panel is sequentially moved from said left projected position through said normal position, said open position, and said normal position to said right projected position in this order, whereas when said motor is operated in the other rotational direction opposite to said one rotational direction, said front panel is sequentially moved from said right projected position through said normal position, said open position, and said normal position to said left projected position in this order.

* * * * *